United States Patent
Tarumoto et al.

(10) Patent No.: US 7,925,097 B2
(45) Date of Patent: Apr. 12, 2011

(54) IMAGE DISPLAY METHOD, IMAGE CODING APPARATUS, AND IMAGE DECODING APPARATUS

(75) Inventors: Tetsu Tarumoto, Gifu (JP); Tsuyoshi Watanabe, Gifu (JP); Yasuo Ishii, Gifu (JP); Shigeyuki Okada, Ogaki (JP); Yoshihiro Matsuo, Hashima (JP); Hideki Yamauchi, Ogaki (JP); Noriaki Kojima, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 960 days.

(21) Appl. No.: 11/356,470

(22) Filed: Feb. 17, 2006

(65) Prior Publication Data

US 2006/0193524 A1    Aug. 31, 2006

(30) Foreign Application Priority Data

Feb. 18, 2005  (JP) ................. 2005-041802
Feb. 18, 2005  (JP) ................. 2005-041803
Mar. 29, 2005  (JP) ................. 2005-095227

(51) Int. Cl.
*G06K 9/36*  (2006.01)
*G06K 9/46*  (2006.01)

(52) U.S. Cl. ........ 382/232; 382/133; 382/240; 382/251; 375/240.24; 375/240.29

(58) Field of Classification Search ............. 382/232, 382/233, 240, 250, 251; 375/240.24, 240.29; 341/50
See application file for complete search history.

(56) References Cited

U.S. PATENT DOCUMENTS

| | | | |
|---|---|---|---|
| 5,680,454 A | 10/1997 | Mead | |
| 6,909,810 B2 * | 6/2005 | Maeda | 382/243 |
| 7,362,860 B2 * | 4/2008 | Hayashi | 380/210 |
| 7,385,921 B2 * | 6/2008 | Itakura et al. | 370/230 |
| 7,602,950 B2 * | 10/2009 | Goldstein et al. | 382/128 |
| 2003/0131251 A1 | 7/2003 | Fetkovich | |
| 2004/0151385 A1 * | 8/2004 | Oneda et al. | 382/232 |
| 2004/0177251 A1 | 9/2004 | Hayashi | |

(Continued)

FOREIGN PATENT DOCUMENTS

JP    07-303103    11/1995

(Continued)

OTHER PUBLICATIONS

Japanese Office Action, with English translation, issued in Japanese Patent Application No. JP 2005-095227 dated on Jun. 17, 2008.

(Continued)

*Primary Examiner* — Samir A Ahmed
*Assistant Examiner* — Ali Bayat
(74) *Attorney, Agent, or Firm* — McDermott Will & Emery LLP

(57) ABSTRACT

An image coding apparatus is provided which satisfies various levels of demands on image distribution, both from image providers and from users. The image coding apparatus includes a coding block which codes predetermined image data. A separation unit separates the coded image data into basic data for reproducing contents of the coded image data as a visible image, and complementary data for complementing the basic data, so that the two pieces of data are distributed on different occasions. An adding unit adds information for independent copyright control to at least either one of the basic data and the complementary data.

10 Claims, 21 Drawing Sheets

U.S. PATENT DOCUMENTS

2004/0184772 A1 9/2004 Kakii
2005/0084158 A1* 4/2005 Yano .......................... 382/232
2005/0244070 A1 11/2005 Itakura

FOREIGN PATENT DOCUMENTS

| JP | 09-046677 | 2/1997 |
| JP | 09-163306 | 6/1997 |
| JP | 11-331804 | 11/1999 |
| JP | 2001-086444 A | 3/2001 |
| JP | 2002-010251 | 1/2002 |
| JP | 2002-142227 | 5/2002 |
| JP | 2003-244676 | 8/2003 |
| JP | 2003-324418 | 11/2003 |
| JP | 2003-533912 | 11/2003 |
| JP | 2004-048774 | 2/2004 |
| JP | 2004-236225 | 8/2004 |
| JP | 2004-274358 | 9/2004 |
| WO | WO 01/86941 A2 | 11/2001 |

OTHER PUBLICATIONS

Chinese Office Action, issued in Chinese Patent Application No. CN 200610091649.4 dated on Oct. 10, 2008.

Japanese Office Action, with English translation, issued in Japanese Patent Application No. 2005-041803, mailed Sep. 1, 2009.

Japanese Notification of Reason(s) for Refusal, w/ English translation thereof, issued in Japanese Patent Application No. JP 2005-041802 dated May 12, 2009.

Japanese Notification of Reason(s) for Refusal, w/ English translation thereof, issued in Japanese Patent Application No. JP 2005-041803 dated May 26, 2009.

* cited by examiner

FIG.4

| | REPRODUC-TION | DUPLICATION | EDIT | REDISTRIBU-TION | GENERATION OF DUPLICATION |
|---|---|---|---|---|---|
| PROFILE A | | | | | |
| HIGH IMAGE QUALITY | PERMITTED | NOT PERMITTED | NOT PERMITTED | NOT PERMITTED | NOT PERMITTED |
| MEDIUM IMAGE QUALITY | PERMITTED | PERMITTED | NOT PERMITTED | NOT PERMITTED | 1 |
| LOW IMAGE QUALITY | PERMITTED | PERMITTED | PERMITTED | NOT PERMITTED | 2~3 |
| PROHIBITED | | | | O | 4 |

FIG.17

| | DISPLAY | INITIAL DISPLAY | TRANSMIS-SION | DUPLICA-TION | EDIT |
|---|---|---|---|---|---|
| PROFILE A | | | | | |
| HIGH IMAGE QUALITY | NOISE | 1 MIN | UNLIMITED | NOT PERMITTED | NOT PERMITTED |
| MEDIUM IMAGE QUALITY | NOISE | 30 SEC | UNLIMITED | UNLIMITED | NOT PERMITTED |
| LOW IMAGE QUALITY | UNLIMITED | | UNLIMITED | UNLIMITED | UNLIMITED |

2034

2038

IMAGE DISPLAY METHOD, IMAGE CODING APPARATUS, AND IMAGE DECODING APPARATUS

BACKGROUND OF THE INVENTION

1. Field of the Invention

The invention relates to an image display method, an image coding apparatus, and an image decoding apparatus which are intended for distribution of image data capable of being separated into a plurality of elements.

2. Description of the Related Art

In recent years, the prevalence of such infrastructures as DVD media, digital broadcasting, and on-demand network communications has produced widespread use of digital contents. Since digital contents cause no degradation in quality even after duplication, copyright management is of high importance. Demands for legitimate protection of copyright on digital contents and other copyrighted materials are expected to grow in the future.

The number of digital contents accessible over the Internet is increasing year by year, and the number of Internet users is as well. This has resulted in an increasing amount of traffic on the Internet. In this respect, Japanese Patent Laid-Open Publication No. Hei 9-46677 discloses an image transmission apparatus which switches among a mode for transmitting only the I frames of MPEG data, a mode for transmitting the I frames and P frames of the same, and a mode for transmitting the I frames, P frames, and B frames of the same depending on the traffic on a transmission line.

Even with such a technique, however, various levels of demands that image providers and users have cannot be fully satisfied. For example, image providers aim for copyright protection and, at the same time, wish to have their contents shown to a large number of users. Meanwhile, users have various orientations ranging from high-end to price-sensitive.

SUMMARY OF THE INVENTION

The present invention has been achieved in view of the foregoing circumstances. It is thus an object of the present invention to provide an image display method, an image coding apparatus, and an image decoding apparatus which are capable of flexible provision of images, beneficial to both image providers and users who use the images.

To solve the foregoing problems, an image distribution method according to one of the aspects of the present invention comprises: separating predetermined image data into basic data for reproducing contents of the predetermined image data as a visible image, and complementary data for complementing the basic data for the sake of improved image quality; first distributing the basic data; and second distributing the complementary data on an occasion different from the distribution of the basic data. The "second distributing" may include distributing the complementary data in response to a request from a destination of the distribution. The "image quality" may include smoothness of motion of a moving image.

According to this aspect, the separation of the image data can increase the variety of modes in which images are provided to users. This allows flexible provision of images which is beneficial to both image providers and users.

The method may further comprise managing copyright on the basic data and the complementary data independently. According to this aspect, it is possible to exercise flexible copyright management, for example, such that either one data is put under a copyright control like storage prohibition while the other is allowed for free use.

When separated, the basic data may include at least either one of a direct-current component and a low frequency component of the image data. According to this aspect, the image data is separated spatially, with at least either one of its direct-current component and low frequency component as the basic data. This makes it possible to generate basic data that has comprehensible contents.

When separated, the basic data may include an intra-frame coded frame out of a plurality of frames constituting the image data. The complementary data may include a frame that is expressed as a difference from another frame. According to this aspect, the image data is separated temporally, with a frame(s) reconstructable independently as the basic data. This makes it possible to generate basic data that has comprehensible contents.

Another aspect of the present invention is an image coding apparatus. This apparatus comprises: a coding unit which codes predetermined image data; and a separation unit which separates the coded image data into basic data for reproducing contents of the coded image data as a visible image, and complementary data for complementing the basic data for the sake of improved image quality.

According to this aspect, the separation of image data can increase the variety of modes in which images are provided to users. This allows flexible provision of images which is beneficial to both image providers and users.

The apparatus may further comprise an adding unit which adds information intended for independent copyright management to at least either one of the basic data and the complementary data. The "adding unit" may record the information when generating a stream of the coded image data, or record the information during postprocessing after the coding.

The separation unit may separate the image data so that the basic data includes at least either one of a direct-current component and a low frequency component of the image data. The basic data may otherwise include an intra-frame coded frame out of a plurality of frames constituting the image data.

Yet another aspect of the present invention is an image decoding apparatus. This apparatus comprises: a recording unit which records in advance basic data for reproducing contents of predetermined image data as a visible image; an acquisition unit which acquires complementary data for complementing the basic data for the sake of improved image quality; an assembling unit which assembles the basic data and the complementary data; and a decoding unit which decodes the assembled image data. The "decoding unit" may decode the basic data.

According to this aspect, the provision of the function for assembling separated pieces of image data makes a mechanism for flexible provision of images, beneficial to both image providers and users, feasible.

The apparatus may further comprise a copyright management unit which refers to information intended for independent copyright management and exercises copyright management, the information being added to at least either one of the basic data and the complementary data. According to this aspect, a mechanism by which image providers exercise flexible copyright management becomes feasible.

The apparatus may further comprise a data request unit which requests data for complementing the basic data from a source of distribution after the basic data is acquired, depending on processing capability of the apparatus. According to this aspect, it is possible to suppress the distribution of useless complementary data that exceeds the processing capability of the apparatus.

Yet another aspect of the present invention is an image display apparatus. This apparatus comprises: an acquisition unit which acquires basic data for reproducing contents of predetermined image data as a visible image and complementary data for complementing the basic data for the sake of improved image quality on respective different occasions, the predetermined image data being separated into the basic data and the complementary data; and a display unit which displays image data assembled from the basic data and the complementary data. The "display unit" may decode and display the basic data.

According to this aspect, the provision of the function for assembling separated pieces of image data makes a mechanism for flexible provision of images, beneficial to both image providers and users, feasible.

The apparatus may further comprise a copyright management unit which refers to information intended for independent copyright management and exercises copyright management, the information being added to at least either one of the basic data and the complementary data. The apparatus may further comprise a data request unit which requests data for complementing the basic data from a source of distribution after the basic data is acquired, depending on processing capability of the apparatus.

Incidentally, any combinations of the foregoing components, and the components and expressions of the present invention mutually replaced with methods, apparatuses, systems, recording medium, programs, and the like are also intended to constitute applicable aspects of the present invention.

Moreover, this summary of the invention does not necessarily describe all necessary features so that the invention may also be sub-combination of these described features.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIG. 4 is a diagram showing an example of a copyright level management table;

FIG. 17 is a diagram showing an example of copyright level information;

DETAILED DESCRIPTION OF THE INVENTION

Embodiment 1

The present invention achieves an image provision system which is appealing to both image providers who provide still and/or moving images and users who use the images. Embodiment 1 will deal with an image coding apparatus 100 which separates image data spatially. For example, the image coding apparatus 100 separates direct-current components and the remaining frequency components as basic data and complementary data, respectively. Then, the two pieces of data are distributed separately or subjected to copyright management independently.

Embodiment 1 can use technologies for generating still images or moving images of different image qualities from a single coded image data stream. By way of example, a method for coding a moving image by using Motion-JPEG 2000 scheme will be described briefly with reference to FIG. 1. A not-shown image coding apparatus generates a coded data stream of a moving image by coding individual frames of the moving image continuously frame by frame. At the beginning of the coding process, an original image OI 102 corresponding to a single frame of the moving image is read into a frame buffer. The original image OI read into the frame buffer is hierarchized by a wavelet transformer.

The JPEG-2000 wavelet transformer uses a Daubechies filter. This filter functions as a high-pass filter and a low-pass filter both in x and y directions of an image simultaneously, thereby dividing the single image into four frequency subbands. The subbands consist of an LL subband, an HL subband, an LH subband, and an HH subband. The LL subband contains low frequency components both in the x and y directions. The HL subband and the LH subband contain low frequency components in either one of the x and y directions and high frequency components in the other direction. The HH subband contains high frequency components both in the x and y directions. This filter also has the function of reducing the number of pixels by half both in the x and y directions. That is, each subband has as many pixels as a half those of the unprocessed image both in the vertical and horizontal directions. A single application of the filtering thus produces subband images having a resolution, i.e., image size of ¼. As employed in this specification, an image obtained by applying a single wavelet transform to the original image OI will be referred to as a first-level image WI1. Hereinafter, an nth-level image will be referred to as WIn in accordance with the number of wavelet transforms applied thereto.

Figure 1:
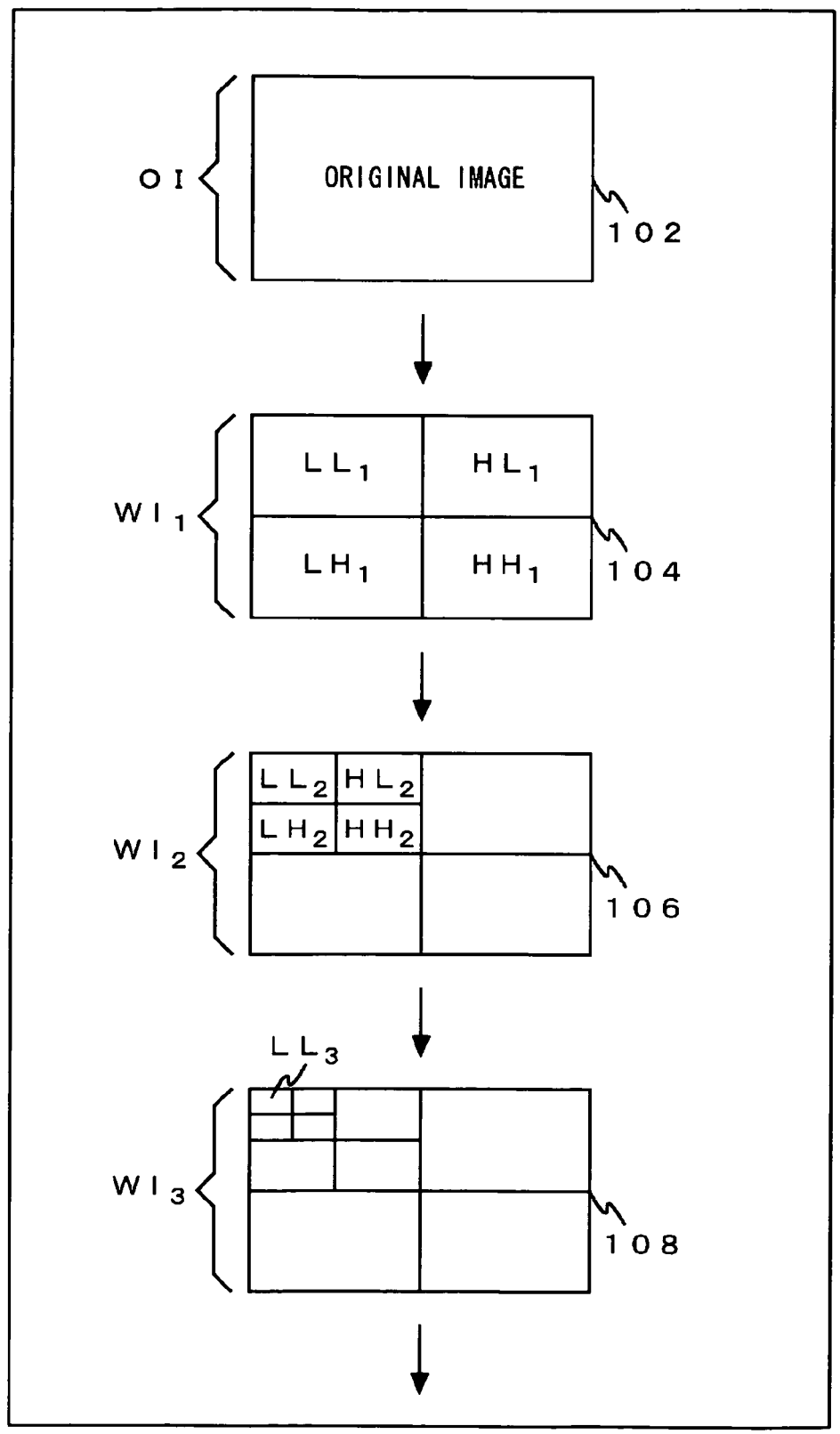
FIG. 1 is a diagram showing the procedure of image coding processing.

As schematically shown in FIG. 1, the first-level image WI1 104 has four subbands LL1, HL1, LH1, and HH1. A wavelet transform is applied to the first-level image WI1 104, whereby a second-level image WI2 106 is generated. The second and subsequent wavelet transforms will be applied to only the LL subband components of the images in the respective previous levels. Consequently, in the second-level image WI2 106, the LL1 subband of the first-level image WI1 is decomposed into four subbands LL2, HL2, LH2, and HH2. The wavelet transformer performs this filtering a predetermined number of times, and outputs the wavelet transform coefficients of the respective subbands. The image coding apparatus then performs quantization and other processing, and finally outputs coded image data CI.

For ease of explanation, the image coding apparatus in this example shall apply three wavelet transforms to the original image OI. Suppose, for example, that the original image OI 102 has 1440×960 pixels. Then, the LL1 subband of the first-level image WI1 104 has a size of 720×480, the LL2 subband of the second-level image WI2 106 a size of 360× 240, and the LL3 subband of the third-level image WI3 108 a size of 180×120.

As far as the hierarchical images are concerned, it should be noted that the low frequency components of the original image OI gather around the upper left in FIG. 1. In the case of FIG. 1, the LL3 subband which falls on the upper left corner of the third-level image WI3 is the lowest in frequency. Conversely, the most basic properties of the original image OI can be reproduced as long as this LL3 subband is accessible.

Aside from Motion-JPEG 2000, the coded data stream may be of, e.g., SVC (Scalable Video Codec) which provides a single stream including both a high quality HD stream and a low quality SD stream in combination. Motion-JPEG is also applicable. Among JPEG schemes are ones in which frames are transmitted in ascending order of the terms of their coefficients obtained by discrete cosine transform. Here, image quality can be selected depending on up to what order of terms the coefficients are used for decoding. According to these specifications, spatial resolution can be coded hierarchically.

The foregoing example has been dealt with the case where the hierarchization is achieved by the coding of frequency division type. Nevertheless, coding of improved approximation accuracy type may be used for hierarchization. More specifically, the number of higher-order bits of DCT (Discrete Cosine Transform) coefficients or wavelet coefficients to be decoded can be adjusted to achieve decoding in different image qualities. In MPEG-2, not only the foregoing spatial resolution but also time resolution can be coded hierarchically by adjusting the number of frames.

Figure 2:
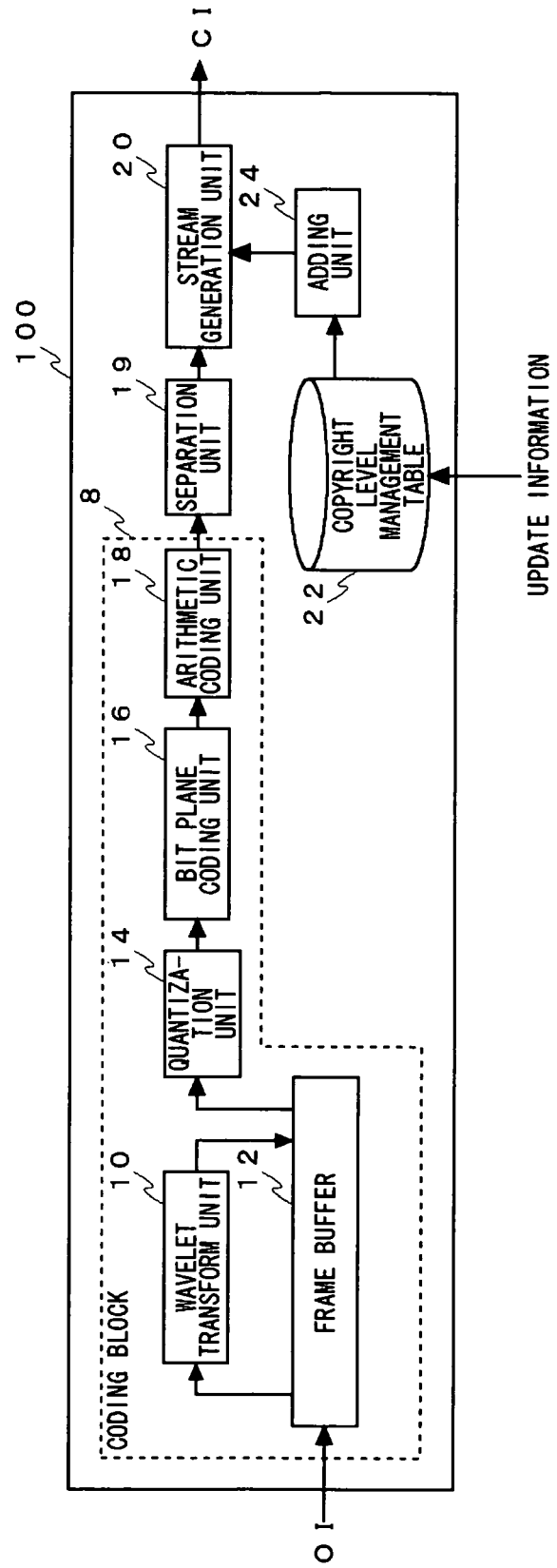
FIG. 2 is a diagram showing the configuration of an image coding apparatus according to embodiment 1.

FIG. 2 shows the configuration of the image coding apparatus 100 according to embodiment 1. In terms of hardware, this configuration can be achieved by an arbitrary computer CPU, a memory, and other LSIs. In terms of software, it can be achieved by a program which is loaded on a memory and has decoding functions. The functional blocks shown here are achieved by the cooperation of these. It will thus be understood by those skilled in the art that these functional blocks may be achieved in various forms including hardware alone, software alone, and combinations of these.

The image coding apparatus 100 includes a coding block 8, a separation unit 19, a stream generation unit 20, a copyright level management table 22, and an adding unit 24. The coding block 8 includes a wavelet transform unit 10, a frame buffer 12, a quantization unit 14, a bit plane coding unit 16, and an arithmetic coding unit 18.

Initially, an original image OI is read into the frame buffer 12. The wavelet transform unit 10 reads the original image OI from the frame buffer 12, and transforms the image by a wavelet transform recursively. As described above, the JPEG-2000 wavelet transform uses a Daubechies filter. This filter functions as a high-pass filter and a low-pass filter both in vertical and horizontal directions of the image, thereby dividing the single image into four frequency subbands. Each subband has as many pixels as ½ those of the unprocessed image both in the vertical and horizontal directions. A single application of the filtering thus produces subband images having a resolution, i.e., image size of ¼. The subband images obtained thus are once stored into the frame buffer 12.

The wavelet transform unit 10 reads the image of the LL subband, or the lowest frequency component out of the resulting subbands, from the frame buffer 12. The wavelet transform unit 10 performs the filtering process again to divide the subband image into four, i.e., LL, HL, LH, and HH subbands further, and writes them to the frame buffer 12. The filtering is performed a predetermined number of times, and the LL subband resulting from the last filtering is acquired as an image the closest to a DC component of the original image OI. The subbands in an identical level, i.e., the four subbands obtained through the application of filtering an identical number of times contain high frequency components that increase in order of LL, HL and LH, and HH. These subbands are followed by images that contain components of higher frequencies, i.e., the four subbands obtained in the previous filtering process. Such vertical and horizontal four-way filtering is applied to the lowest frequency components repeatedly. As a result, an image having a vertical and horizontal four-way recursive structure, which contains low to high frequency components in a hierarchical configuration, is obtained in the frame buffer 12.

The quantization unit 14 quantizes the hierarchical image stored in the frame buffer 12 from lower to higher frequency components in succession as needed. The bit plane coding unit 16 renders the wavelet coefficients, quantized and divided into units called code blocks for arithmetic coding, into a bit plane. The arithmetic coding unit 18 arithmetically codes this bit plane.

By using the arithmetically coded bit string, the separation unit 19 separates each level of bit stream into a plurality of groups. For example, the first-level image WI1 104 of FIG. 1 may be separated between a group of the subband LL1 and a group of the other three subbands HL1, LH1, HH1.

Figure 3:
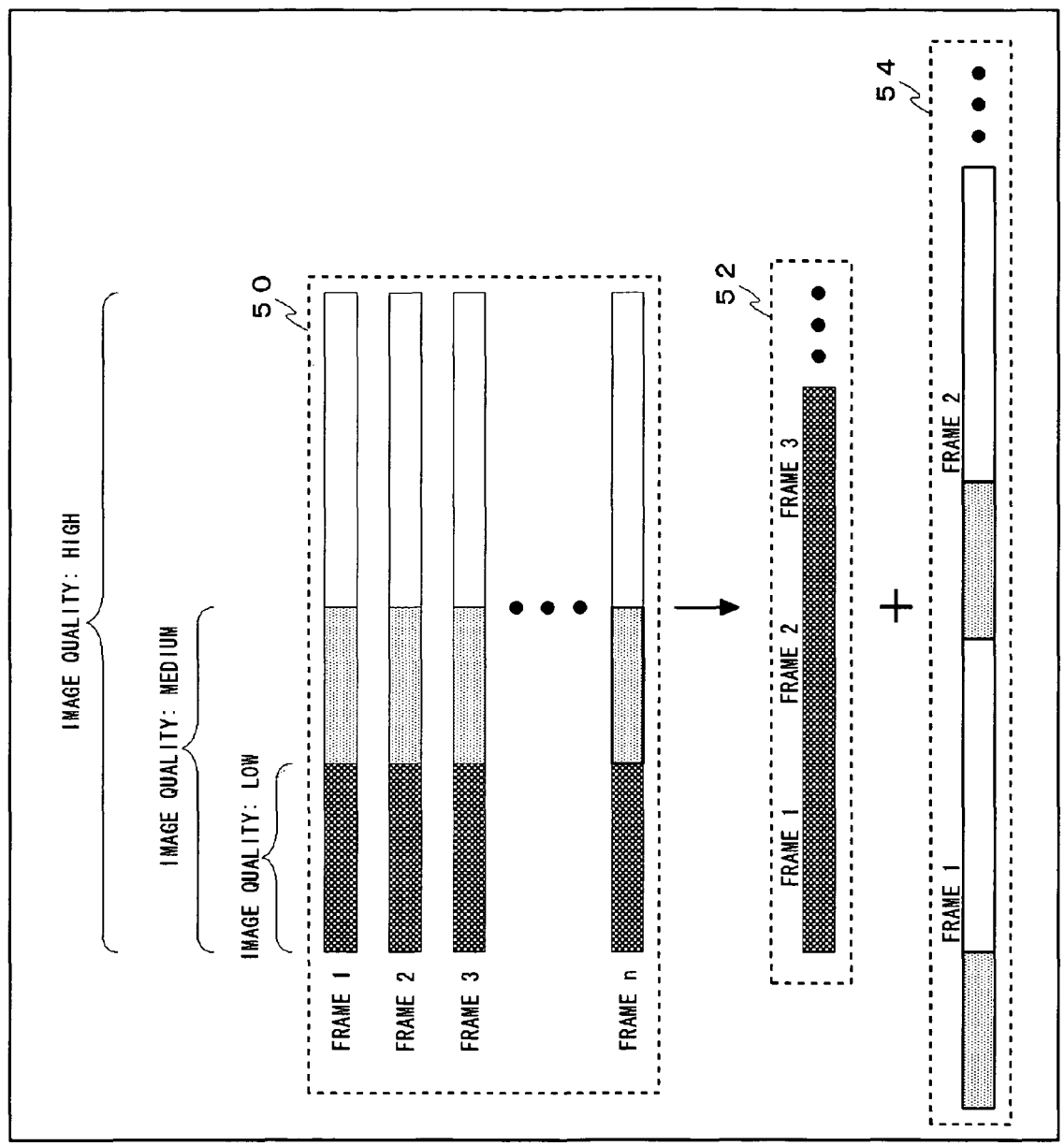
FIG. 3 is a diagram showing the structures of coded image data before and after spatial separation.

FIG. 3 shows the structures of the coded image data before and after the spatial separation. In each of the frames of such hierarchical coded image data 50 as discussed above, the data area describes data on a direct current component, a low frequency component, a medium frequency component, and a high frequency component in succession from the top. Thus, it is possible to reproduce images even from the first portions of the respective frames alone, whereas the images are low in quality. The image improves in quality as the last portions are involved in the reproduction. In FIG. 3, this coded image data 50 is separated into coded image data 52 on direct-current components and low frequency components, and coded image data 54 on medium frequency components and high frequency components. Incidentally, the number of classifications is not limited to two, but may be three or more. For example, the coded image data on the medium frequency components and the coded image data on the high frequency components may be classified separately.

The stream generation unit 20 generates a bit stream from each of the bit strings classified by the separation unit 19. Through these processes, the foregoing original image OI is transformed into a plurality of pieces of coded image data CI which are separated hierarchically.

These plurality of pieces of coded data CI are provided to users on respective different occasions by various methods. For example, the coded image data on direct-current components and low frequency components may be distributed for free. Here, the data may be distributed as a trial version on DVD-ROM or suchlike media, or may be downloaded by users over a network. The coded image data on medium and high frequency components is provided to the users subsequently. Again, the data may be distributed in media or downloaded from a server. This coded image data may also be provided through streaming distribution so as not to be recorded by the users. This streaming distribution may be provided to paid users on demand.

According to this technique, users can appreciate images for free as long as they reproduce the images in low quality, whereas they must pay to view the images when reproducing in high quality. Since the separate pieces of coded image data are thus provided to users on different occasions by various methods, image providers can make detailed copyright management with respect to each image quality. This increases the range of sales techniques of the image contents. Besides, users can enjoy more options and access image contents of their own tastes.

Hereinafter, description will be given of a technique by which an image provider makes more detailed copyright management. The copyright level management table 22 and the adding unit 24 are used for that purpose. The copyright level management table 22 manages copyright levels to be permitted to users who use the coded image data CI. FIG. 4 shows an example of the copyright level management table 22. The applications of the coded image data CI are shown on the horizontal axis, and the permitted image quality levels corresponding to each application on the vertical axis. These permitted image quality levels shall correspond to the respective pieces of coded image data separated by the separation unit 19. In FIG. 4, reproduction is permitted in all the low, medium, and high image quality levels. Duplication is prohibited in the high image quality level, and permitted in the low and medium image quality levels. Edit is prohibited in the medium and high image quality levels, and permitted in the low image quality level. Here, the editing includes such operations as removing commercial breaks from coded image data that is received in a digital television broadcast. Consequently, the data can be duplicated in the medium image quality, but not when commercial breaks are removed. Redistribution is prohibited. Redistribution is not permitted in any of the image quality levels.

The generation of duplication shows duplicable generations and the permitted image quality levels in those generations. The first generation is duplicable in medium image quality. The duplication of the second generation, or the duplication of data from the first generation, can only be permitted in low image quality. None of the fourth and subsequent generations can be duplicated. The copyright level management table 22 manages such a profile as described above user by user. The individual items of the profile can be updated through key entry and the like by administrators when needed.

When the coded image data CI is provided to paid users, the available applications and the permitted image quality levels for those applications vary depending on fees paid by the users and price plans selected. The profiles may also be created region by region or time by time, instead of user by user. For example, time-based profiles can be created to impose time limits on the availability of contents for users. If user apparatuses are configured to switch profiles after a certain period in time, time limits can be set so as to lower the permitted image quality levels or restrict some uses, instead of making all the contents unavailable after that period.

The adding unit 24 records copyright level information on the corresponding profile into header or other areas of the respective pieces of coded image data CI in consideration of such factors as users and regions to be provided. The copyright level information may be written to header and other areas that can be set by administrators freely. In such cases as establishing time limits, copyright level information on a plurality of profiles may be added. Incidentally, the copyright level information need not be added to coded image data that corresponds to image quality levels not subject to copyright management. The copyright level management table 22 and the adding unit 24 may be configured as an external independent device. This device can access a network to add copyright level information to the coded image data CI that is being communicated over the network.

As has been described, according to the present invention, it is possible to make flexible provision of images which is beneficial to both image providers and users who use the images. Image providers can also manage copyrights with respect to each of the pieces of coded image data separated, thereby achieving detailed copyright management. The separation into a plurality of pieces of coded image data includes generating coded image data on direct-current components and low frequency components from which an image having visible contents can be reproduced. This makes various sales channels and various sales promotion techniques usable. For example, the coded image data can be distributed as a trial image since it has visible contents. Then, users who want to view in high image quality request the coded image data on the remaining frequency components, and the image provider distributes it to the users in response. This allows a saving of the hardware resources. That is, the amount of traffic on the network can be reduced as compared to the cases where the complete set of coded image data including the high frequency components is distributed to every user. This also makes it possible to save recording capacities on hard disks or the like of the receiving user terminals.

Embodiment 2

Embodiment 2 is an image decoding apparatus 200 which can acquire a plurality of hierarchically separated pieces of coded image data on different occasions, and decode the pieces of coded image data assembled. Incidentally, the image decoding apparatus 200 also functions as an image display apparatus if it is equipped with a display unit 38.

Figure 5:
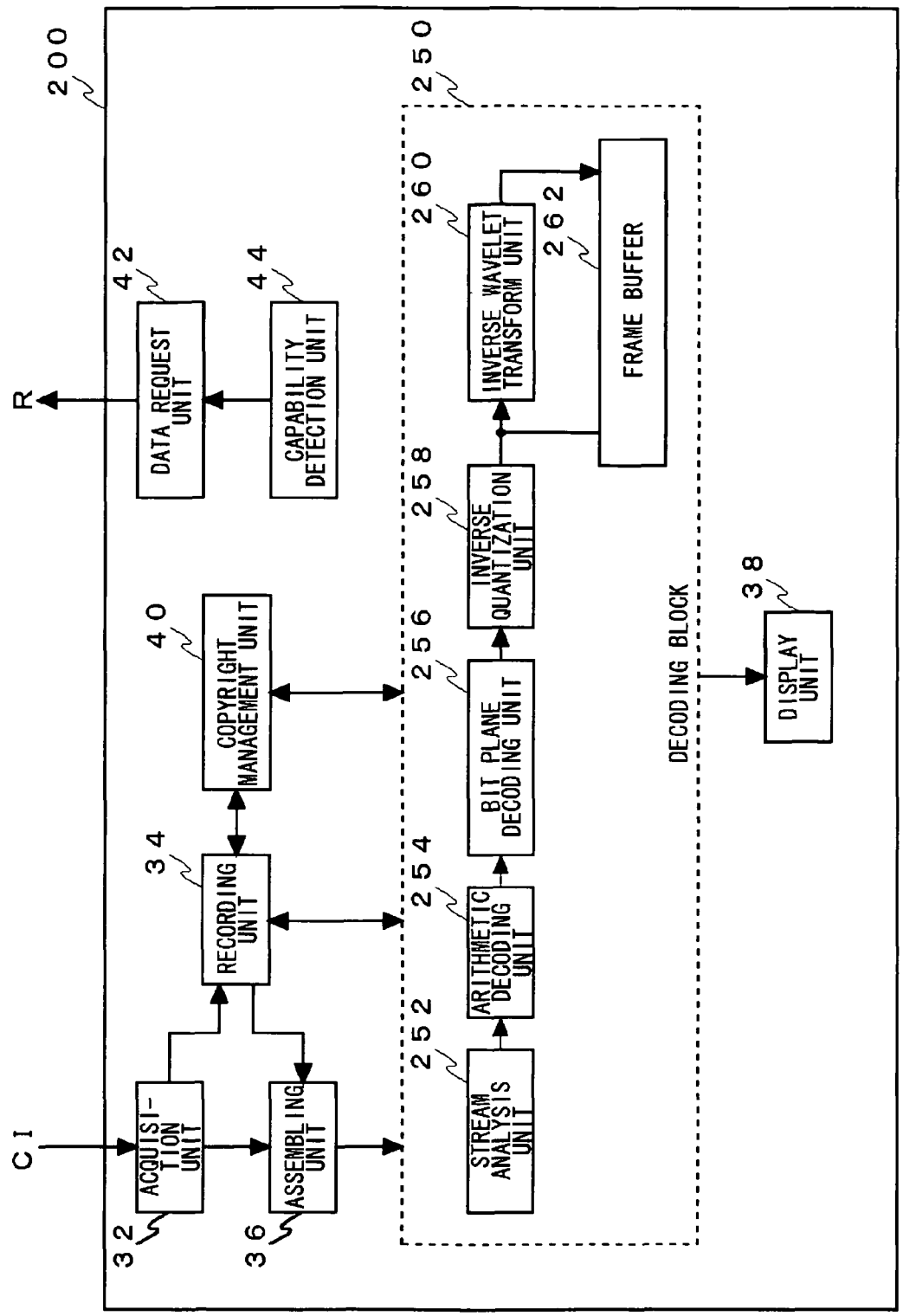
FIG. 5 is a block diagram showing the configuration of an image decoding apparatus according to embodiment 2.

FIG. 5 shows the configuration of the image decoding apparatus 200 according to embodiment 2. The image decoding apparatus 200 comprises an acquisition unit 32, a recording unit 34, an assembling unit 36, and a decoding block 250. The acquisition unit 32 acquires coded image data CI which is separated hierarchically as described in embodiment 1. The acquisition unit 32 may acquire the data by downloading it over a network, or acquire it from a recording medium containing the same. Broadcasting waves may also be used for the acquisition. The acquisition unit 32 records the coded image data CI acquired into the recording unit 34. Incidentally, when the storage of the data is prohibited due to streaming distribution or the like, the data cannot be recorded on the recording unit 34 and thus is output directly to the decoding block 250.

When the acquired data itself is capable of forming an image having comprehensible contents, like coded image data on direct-current components and low frequency components, the coded image data is output to the decoding block 250 so that the user can view the image.

The assembling unit 36 separates a plurality of pieces of coded image data acquired on different occasions into frames, and assembles corresponding frames with each other. The assembling unit 36 then arranges the assembled frames in order, thereby reconstructing the unseparated coded data. For example, the processing is reverse to that of separating the coded image data shown in FIG. 3 above. In FIG. 3, the coded image data 52 on direct-current components and low frequency components and the coded image data 54 on medium frequency components and high frequency components are both divided into frames. For each frame, the divided elements are then reconstructed in order of a direct-current component, a low frequency component, a medium frequency component, and a high frequency component from the top of the data area. Finally, the reconstructed frames are connected in order. Incidentally, original coded image data can also be reconstructed from three or more pieces of coded image data by the same technique.

The assembling unit 36 acquires the plurality of pieces of coded image data to be reconstructed from at least either one of the acquisition unit 32 and the recording unit 34. For example, coded image data on direct-current components and low frequency components that is previously recorded on the recording unit 34 and coded image data on medium frequency components and high frequency components that is streaming-distributed can be assembled. The coded image data assembled is then output to the decoding block 250.

The decoding block 250 comprises a stream analysis unit 252, an arithmetic decoding unit 254, a bit plane decoding unit 256, an inverse quantization unit 258, an inverse wavelet transform unit 260, and a frame buffer 262. The stream analysis unit 252 receives coded image data CI from the assembling unit 36 or the recording unit 34, and analyzes the data stream. When copyright level information is included in the header or the like of the coded image data CI, the stream analysis unit 252 detects and passes it to a copyright management unit 40. The arithmetic decoding unit 254 applies arithmetic decoding to a data string to be decoded which is obtained by the analysis. The bit plane decoding unit 256 decodes the data resulting from the arithmetic decoding into a bit plane with respect to each color component. The inverse quantization unit 258 inversely quantizes the quantized data decoded. The inverse wavelet transform unit 260 applies inverse wavelet transforms to the nth-level image WIn resulting from the inverse quantization, by using the frame buffer 262. Each time an inverse wavelet transform is applied to the coded image data CI, an image of higher level is obtained. Decoding up to the topmost level produces decoded image data DI.

The display unit 38 displays the decoded image data DI decoded by the decoding block 250. In FIG. 5, the display unit 38 is shown inside the image decoding apparatus 200, whereas it may be installed outside the apparatus 200. The copyright management unit 40 manages the copyright on the coded image data CI for use in this apparatus 200. What is managed is the copyright level information detected by the stream analysis unit 252, or copyright level information acquired through sessions with s server and the like of the contents provider. For example, when a user uses the coded image data CI, the copyright management unit 40 may identify the permitted image quality level corresponding to that application. According to the image quality level, the copyright management unit 40 then instructs the inverse wavelet transform unit 260 of the number of times for the inverse wavelet transform to be applied. In such cases, coded image data for achieving high image quality, even if included, cannot be reproduced or used with that image quality.

When the recording unit 34 previously contains some of the unseparated coded image data, the data request unit 42 requests the distribution of the rest of the coded image data to the server or the like of the contents provider. For example, if the coded image data on direct-current components and low frequency components is stored in advance, the complementary coded image data on medium frequency components and high frequency components may be requested. This data request may be made in response to user operations or based on the specifications of this image decoding apparatus 200.

In the cases of user operations, the complementary coded image data may be charged for. Considering the tradeoff between desired image qualities and fees, users can request the coded image data on medium frequency components and high frequency components at relatively high price, or request the coded image data on medium frequency components at relatively low price.

A capability detection unit 44 detects the processing capabilities of this image decoding unit 200. For example, it detects the processing capabilities of the decoding block 250, and the processing capabilities of the display unit 38 including resolution. The processing capabilities of the decoding block 250 may include computing power and a buffer capacity. Based on the processing capabilities detected, the capability detection unit 44 determines which coded image data to request from the image provider. For example, the capability detection unit 44 calculates the maximum performance of this image decoding apparatus 200, assumes coded image data having highest image quality or resolution within that range, and determines coded image data necessary to achieve this. The capability detection unit 44 passes to the data request unit 42 the information as to the coded image data that is to request from the image provider in order to complement the coded image data recorded previously on the recording unit 34.

The data request unit 42 passes the information to the image provider. The information need not necessarily be transmitted to the image provider in response to user operations, but may be transmitted automatically over a network. For example, the data request unit 42 may transmit the information when the coded image data on direct-current components and low frequency components is acquired. The data request unit 42 may acquire the maximum performance of the image decoding apparatus 200 from the capability detection unit 44, and transmit it to the image provider. In this case, the image provider can take the information into account when determining the amount of complementary data on the coded image data, and can thus suppress useless distribution exceeding the processing capabilities of the destination decoding apparatus.

Moreover, when requesting the complementary coded image data in response to user operations, the data request unit 42 may use the foregoing maximum performance as the upper limit and issue a complement request within the range conforming to the performance.

As has been described, according to the present invention, it is possible to provide an image decoding apparatus that contributes to the realization of flexible provision of images which is beneficial to both image providers and users who use the images. For example, users can receive coded image data on direct-current components and low frequency components capable of generating an image having visible contents, view the image, and determine if they want to view in higher image quality. For image providers, this technique is securer than in the cases where the copyright for high quality reproduction is protected by limiting the degree of decoding without separating the coded image data, since the necessary data itself is not delivered to users. Moreover, some users should not want to view in high quality, in which case the amount of traffic on the entire network can be suppressed since the complementary coded image data need not be transmitted. Requesting the complementary coded image data from image providers in consideration of the processing capabilities of the decoding apparatus can also reduce useless data distribution with a further suppression in traffic.

Embodiment 3

Embodiment 3 will deal with an image coding apparatus 100 which separates image data temporally. The image coding apparatus 100 separates some of a plurality of frames constituting a moving image as basic data and the remaining frames as complementary data. Here, some of a plurality of frames refer to a combination of such frames as extracted from every eight frames. Then, the two pieces of data are distributed separately or subjected to copyright management independently.

The configuration and operation of the image coding apparatus 100 according to embodiment 3 are basically the same as in embodiment 1. Hereinafter, description will be given of the differences. While embodiment 1 has dealt with the case where the moving image is coded under the Motion-JPEG 2000 scheme, embodiment 3 will deal with an example of MPEG-based coding. The MPEG-based coding is a common technology, and detailed description thereof will thus be omitted. To describe the MPEG-based coding briefly in conjunction with FIG. 2, the coding block 8 often performs discrete cosine transform instead of the wavelet transform. Another process is also added in which inter-frame motion compensation prediction is performed before coefficient transformation, so that inter-frame prediction errors are subjected to the transformation.

The separation unit 19 separates a plurality of frames coded by the coding block 8 into a plurality of groups. For example, the plurality of frames may be separated into a group of I frames and a group of the others, or into a group of I frames, a group of P frames, and a group of B frames. I frames are intra-coded frames, and can form images independently. P frames are ones obtained by coding forward prediction errors in a series of frames. B frames are ones obtained by coding bidirectional prediction errors in a series of frames.

Figure 6:
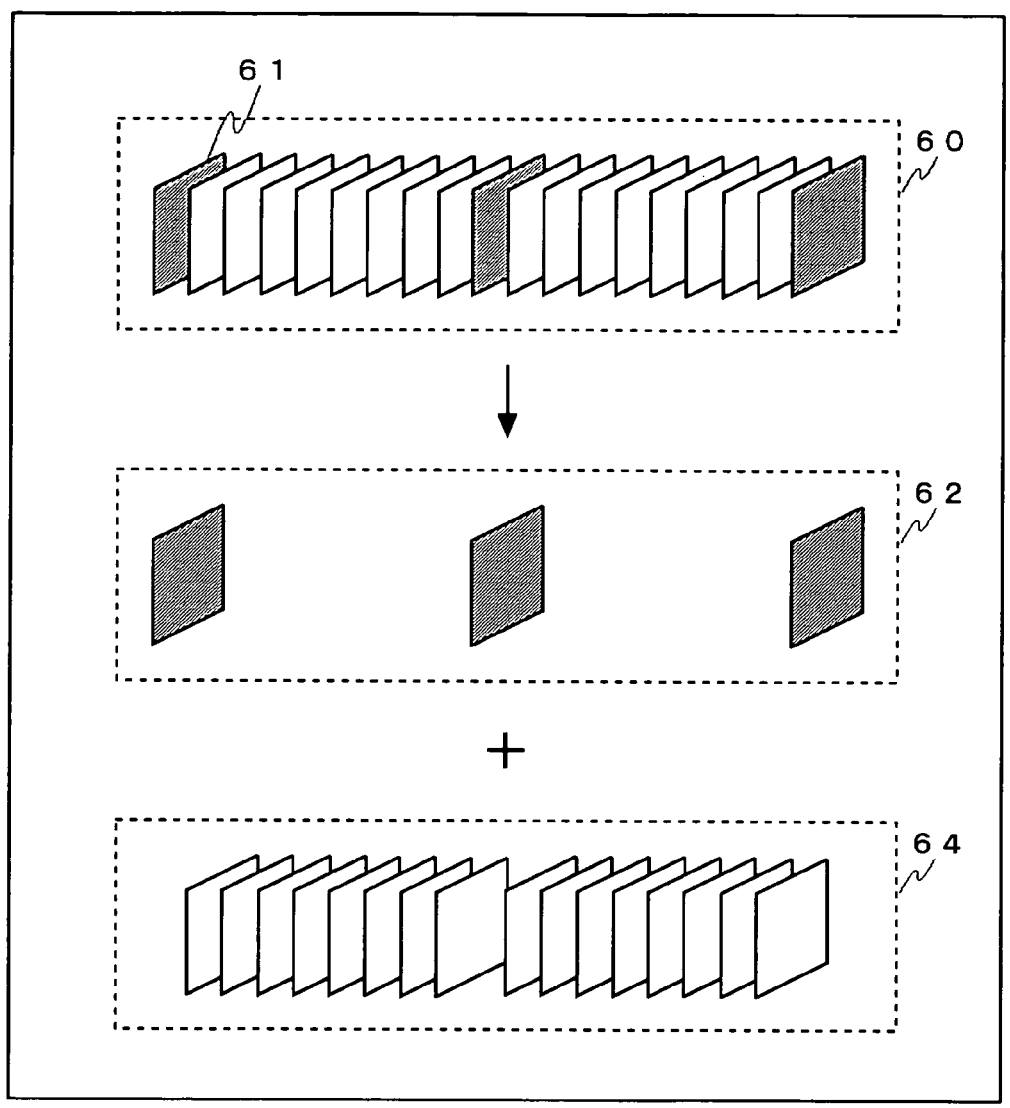
FIG. 6 is a diagram showing the structures of coded image data before and after temporal separation.

FIG. 6 shows the structures of coded image data before and after the separation. Coded image data 60 before the separation includes intra-coded frames 61 and frames coded by using prediction errors between frames. A moving image reproduced from the intra-coded frames 61 alone shows jerky image motion like a slide show. It is possible, however, to recognize the contents unless the intra-coded frames 61 are extremely small in proportion.

In FIG. 6, the coded image data 60 is separated into coded image data 62 consisting of the intra-coded frames 61 and coded image data 64 consisting of the other frames which are coded by using prediction errors between frames. Incidentally, the number of classifications is not limited to two, but may be three or more. For example, the foregoing group of P frames may be further separated into odd-numbered and even-numbered ones. It is understood that the group of I frames may also be separated.

As has been described, the present embodiment provides the same effects as those of the foregoing embodiment 1. With temporal separation, still images constituting a moving image can be distributed as a trial version without losing image quality. This can provide a high visual impact on users, thereby promising a high advertising effect.

Embodiment 4

Embodiment 4 is an image decoding apparatus 200 which can acquire a plurality of pieces of coded image data separated into frames of different coding schemes on different occasions, and decode the pieces of coded image data assembled. Incidentally, the image decoding apparatus also functions as an image display apparatus if it is equipped with a display unit 38.

The configuration and operation of the image decoding apparatus 200 according to embodiment 4 are basically the same as in embodiment 2. Hereinafter, description will be given of the differences. While embodiment 2 has dealt with the case of assembling a plurality of pieces of coded image data that are separated spatially, embodiment 4 will deal with an example of assembling temporally separated ones.

Based on a plurality of pieces of coded image data acquired on different occasions, the assembling unit 36 arranges frames in proper order before the separation, thereby reconstructing the coded image data before the separation. For example, the processing is reverse to that of separating the coded image data shown in FIG. 6 above. In FIG. 6, the individual frames included in the coded image data 62 consisting of the intra-coded frames 61 and the coded image data 64 consisting of the frames coded by using prediction errors between frames are rearranged into proper order before the separation, whereby the coded image data 60 before the separation is reconstructed. Incidentally, original coded image data can also be reconstructed from three or more pieces of coded image data by the same technique.

The decoding of MPEG-coded image data is a common technology, and detailed description thereof will thus be omitted. To describe the decoding of the coded image data briefly in conjunction with FIG. 5, the decoding block 250 performs inverse discrete cosine transforms instead of the inverse wavelet transforms if there are DCT coefficients coded by the discrete cosine transforms on the coding side. The inverse transform must also be followed by motion compensation processing based on reference images and prediction errors.

As has been described, the present embodiment provides the same effects as those of the foregoing embodiment 2. When coded image data is temporally separated and a group of frames thereof that can reconstruct images independently are acquired, it is possible to view still images constituting the moving image without losing image quality. Consequently, users can make a determination whether or not to request the complementary data of this moving image, even in terms of quality of the image itself. Besides, the time-based assembly of frames can be performed relatively easily.

Up to this point, the present invention has been described in conjunction with several embodiments thereof. The foregoing embodiments have been given solely by way of example. It will be understood by those skilled in the art that various modifications may be made to combinations of the foregoing components and processes, and all such modifications are also intended to fall within the scope of the present invention.

Embodiment 2 has dealt with hierarchization of frequency division type. However, hierarchization of improved approximation accuracy type may be used instead. In this case, images of various image quality levels can be decoded by discarding a predetermined number of lower-order bits out of the bit string of the wavelet transform coefficients. That is, the copyright management unit 40 can adjust the image quality level by instructing the bit plane decoding unit 256 of the number of bits to transform.

When this method of hierarchization is used, it is possible to make a distinction in image quality level between individual areas of an image. In that case, each of the profiles on the table for managing the copyright level information shown in FIG. 4 may be described with three parameters, i.e., application, image quality level, and image area, not the two parameters or the application and image quality level alone. The profiles may also be descried with two parameters of image quality level and image area. In this case, contents providers can exercise more flexible copyright management than in the foregoing embodiments.

Different image quality levels can be achieved not only by hierarchizing the resolution, but by hierarchizing the compression rate or the number of colors as well. The compression rate can be hierarchized by using the layering function of JPEG 2000. Color images are expressed by luminance components and color-difference components. Then, the color-difference components may be subjected to the foregoing hierarchization techniques.

Embodiment 5

The technical field of embodiments 5 to 7 is as follows. The invention relates to an image display method, an image coding apparatus, an image decoding apparatus, and an image display apparatus which can be used to reproduce a moving image acquired through streaming distribution or the like.

The related art of embodiments 5 to 7 is as follows. In recent years, the prevalence of such infrastructures as DVD media, digital broadcasting, and on-demand network communications has produced widespread use of digital contents. Since digital contents cause no degradation in quality even after duplication, copyright management is of high importance. Demands for legitimate protection of copyright on digital contents and other copyrighted materials are expected to grow in the future.

To protect copyright on images, Japanese Patent Laid-Open Publication No. Hei 9-163306 discloses a technique for setting degrees of permission of information reproduction (hereinafter, referred to as protect levels) stepwise and reproducing contents depending on users of the contents. More specifically, moving images of higher quality are distributed to users of higher protect levels, and moving images of degraded quality are distributed to users of lower protect levels.

With the prevalence of the foregoing infrastructures, image contents providers are growing in number and the competition is becoming tough. These providers are competing fiercely in expanding sales of their image contents, while being aware of the importance of copyright protection. Image contents providers who carry advertisements as their main sources of income are also pursuing an increasing number of users who use the contents provided.

The problems to be solved by embodiments 5 to 7 are as follows. In Japanese Patent Laid-Open Publication No. Hei 9-163306 mentioned above, the users of lower protect levels can only view low quality moving images, not the original high quality images. With low quality moving images, it is difficult for the contents to impress the users of lower protect levels. Those contents have thus been not quite effective in terms of advertisement, nor adequate to promote the purchase of the contents and the subscription to contents distribution services.

The present invention has been achieved in view of the foregoing circumstances. It is thus another object of the present invention to provide an image display method, an image coding apparatus, an image decoding apparatus, and an image display apparatus which can perform both protection of copyright and promotion of use of image contents.

The means for solving the problems of embodiments 5 to 7 are as follows. To solve the foregoing problems, an image display method according to one of the aspects of the present invention comprises: displaying a moving image while changing its quality with time in accordance with a predetermined setting value. The "quality" may be degraded. According to this aspect, image providers can show both high and low quality images to users. It is therefore possible to impress users with the high quality image while providing copyright protection on the image contents.

The setting value may be one for reducing at least one of resolution, image quality, and a frame rate of the moving image stepwise. At least one of a luminance and color differences of the moving image may be reduced stepwise. A display area of the moving image may be narrowed down stepwise. The "display area" may be narrowed by reducing the size of the image to be displayed itself. "Stepwise" may cover the situations where the moving image has three or more quality states. The visible area may be reduced without changing the size of the image itself. According to this aspect, the image to be shown to users can be adjusted in quality, and the quality can be lowered for copyright protection.

A predetermined advertisement may be displayed outside the display area of the moving image. According to this aspect, image providers can obtain advertising opportunities and sources of income.

The setting value may be fixed in response to a predetermined action of a user. The "predetermined action" may be data transmission for informing an image provider of legal intention to pay a fee. The "setting value" may be fixed to a value for normal reproduction. According to this aspect, cancellation of copyright management can be associated with fee acquisition, thereby promoting sales and the like of image contents.

Another aspect of the present invention is an image coding apparatus. This apparatus comprises: a coding unit which codes moving image data; and an adding unit which adds a predetermined setting value to the coded moving image data so that the coded moving image data, when displayed, changes in quality with time. According to this aspect, image providers can show both high and low quality images to users. It is therefore possible to impress users with the high quality image while providing copyright protection on the image contents.

Yet another aspect of the present invention is also an image coding apparatus. This apparatus comprises: a coding unit which codes moving image data so that the data, when displayed, changes in quality with time; and a quality setting unit which supplies the coding unit with a setting value for changing the quality. According to this aspect, image providers can show both high and low quality images to users. It is therefore possible to impress the users with the high quality image while providing copyright protection on the image contents. Besides, a period for degrading the quality can be established to reduce the volume of the coded image data to be distributed.

Yet another aspect of the present invention is an image decoding apparatus. This apparatus comprises: a decoding unit which decodes coded moving image data; and a quality setting unit which supplies the decoding unit with a setting value set so that quality changes with time. The decoding unit decodes the data while changing its quality in accordance with the setting value. According to this aspect, high quality images of image contents can be viewed for a certain period even when the contents are under copyright management. This makes it easier for users to evaluate the image contents.

Yet another aspect of the present invention is an image display apparatus. This apparatus displays a moving image while changing its quality with time in accordance with a predetermined setting value. According to this aspect, high quality images of image contents can be viewed for a certain period even when the contents are under copyright management. This makes it easier for users to evaluate the image contents.

Incidentally, any combinations of the foregoing components, and any expressions of the present invention converted between methods, apparatuses, systems, computer programs, recording medium, and the like are also intended to constitute applicable aspects of the present invention.

Now, the present invention will be overviewed. Contents creators or copyrighters configure settings for changing such parameters as image quality and a frame rate so that moving images are reproduced at degraded quality for an arbitrary period. Viewers can view the images in original quality by making some kind of contract such as fee payment to contents providers. The parameters to be changed include resolution, image quality, a frame rate, and color. The display area may be narrowed down. In that case, messages for billing purpose and advertisements may be displayed outside the area.

Description will first be given of an example for achieving the foregoing, where coded image data generated with no quality adjustment on the coding side is distributed to the decoding side, and the moving image is displayed while the quality is adjusted on the decoding side.

Figure 7:
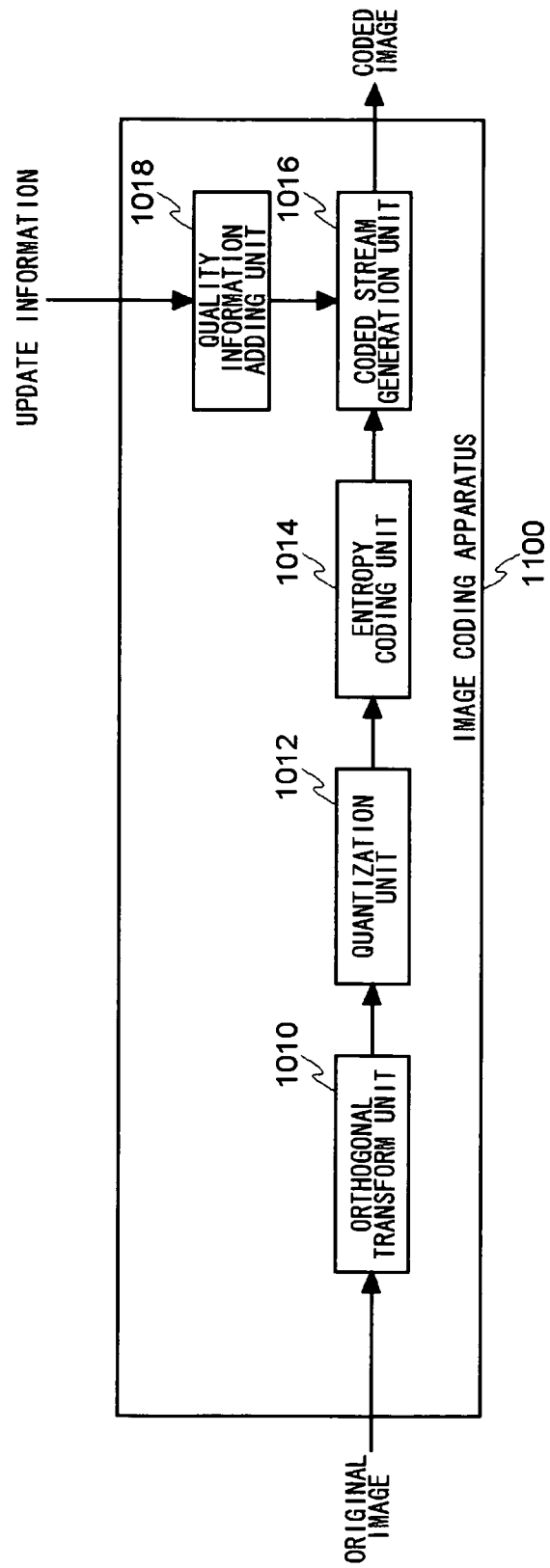
FIG. 7 is a block diagram of an image coding apparatus according to embodiment 5.

FIG. 7 is a block diagram of an image coding apparatus 1100 according to embodiment 5. In terms of hardware, the image coding apparatus 1100 can be achieved by an arbitrary computer CPU, a memory, and other LSIs. In terms of software, it can be achieved by a program which is loaded on a memory and has coding functions. The functional blocks shown here are achieved by the cooperation of these. It will thus be understood by those skilled in the art that these functional blocks may be achieved in various forms including hardware alone, software alone, and combinations of these.

An orthogonal transform unit 1010 applies a wavelet transform, a discrete cosine transform, or the like to an input original image. For example, in the case of a wavelet transform, the orthogonal transform unit 1010 divides the input original image into subbands, calculates the wavelet transform coefficients of the individual subband images, and generates hierarchical wavelet coefficients. Specifically, the orthogonal transform unit 1010 applies a low-pass filter and a high-pass filter to the original image both in x and y directions, thereby dividing the original image into four frequency subbands for wavelet transform. These subbands consist of an LL subband, an HL subband and an LH subband, and an HH subband. The LL subband contains low frequency components both in the x and y directions. The HL subband and the LH subband contain low frequency components in either one of the x and y directions and high frequency components in the other direction. The HH subband contains high frequency components both in the x and y directions. Each subband has as many pixels as ½ those of the unprocessed image both in the vertical and horizontal directions. A single application of the filtering thus produces subband images having a resolution, i.e., image size of ¼.

Among the subbands obtained thus, the orthogonal transform unit 1010 applies filtering to the LL subband again, thereby dividing the same into LL, HL, LH, and HH four subbands further for wavelet transform. The orthogonal transform unit 1010 performs this filtering a predetermined number of times to transform the original image into hierarchical subband images, and outputs the wavelet transform coefficients of the respective subbands. A quantization unit 1012 quantizes predetermined coefficients, such as the wavelet transform coefficients output from the orthogonal transform unit 1010, at predetermined quantization widths.

An entropy coding unit 1014 entropy-codes the values quantized by the quantization unit 1012. For example, it scans and codes the quantized values from the upper bit planes in succession. As can be seen, the target to be coded by the entropy coding unit 1014 is the original image. The entropy coding unit 1014 thus functions as an image coding unit.

A quality information adding unit 1018 adds information for controlling the quality with which the stream coded by this image coding apparatus 1100 is decoded and displayed (hereinafter, referred to as quality information), to the coded stream. This quality information defines at least any one of various parameters including the resolution, image quality, frame rate, display area, color differences, and brightness for decoding, in association with a lapse of time schedule during decoding. For example, in the case of the resolution, the resolution can be set to decrease with time during decoding and display. For instance, an image is decoded at full resolution for five minutes since the start of the decoding, decoded without high frequency components for the next five minutes, and decoded without medium and high frequency components in the next five minutes. Eventually, direct-current components alone may be decoded and displayed. This decoding method is suited to coded stream decoding having a SVC (Scalable Video Codec) function such as the foregoing wavelet transform.

In the case of controlling the image quality, the numbers of bits of the multi-bit coefficients, such as wavelet transform coefficients and discrete cosine transform coefficients, to be decoded may be decreased with time. Image quality can be degraded by quitting decoding lower bits gradually.

The display area can be controlled by establishing a region of interest (ROI) in the image. Information for specifying the region of interest (hereinafter, referred to as ROI information) includes position, shape, size, and image quality. This ROI information may also be set so that the size decreases with time. The contents of the quality information will be detailed later along with other parameters.

The quality information adding unit 1018 can write to coded stream headers. There are various levels of headers, and any of them may be used for that purpose. For example, the quality information may be written to a stream header, a sequence header, a GOP (Group of Picture) header, a frame header, a picture header, and so on.

The quality information adding unit 1018 can generate information for disabling quality management on the decoding side depending on such factors as a fee payment by a user on the decoding side. This information is added to the coded data of the image in a coded stream generation unit 1016 to be described later, or transmitted to the user's image decoding apparatus to be described later, thereby disabling the quality management on the moving image in the image decoding apparatus.

The coded stream generation unit 1016 generates a coded stream based on the coded data of the image input from the entropy coding unit 1014, the coded data on the quality information input from the quality information adding unit 1018, etc. The coded stream generation unit 1016 then outputs the coded stream generated to a network or a recording medium.

As has been described, according to the present embodiment, it is possible to achieve an image coding apparatus which can perform both protection of copyright and promotion of use of moving images. Image providers can protect copyright by degrading the quality of the moving images with time. Besides, it is possible to show high quality images for a certain period and impress users, thereby promoting the sales of the contents and the subscription to contents distribution services. For example, the beginning of a program is distributed for free and in high quality in order to attract viewers, and then the quality is gradually lowered in the middle of the program. This can fuel the contents-buying motivations of viewers who want to view the whole program.

Moreover, image providers can create contents easily with a reduction in memory area since moving image data need not be provided for trial purpose and for reproduction purpose separately. Furthermore, in the case of narrowing down the display area, it is possible to use the remaining space for advertisements of their own or other companies, and thereby earn advertising income.

Embodiment 6

Figure 8:
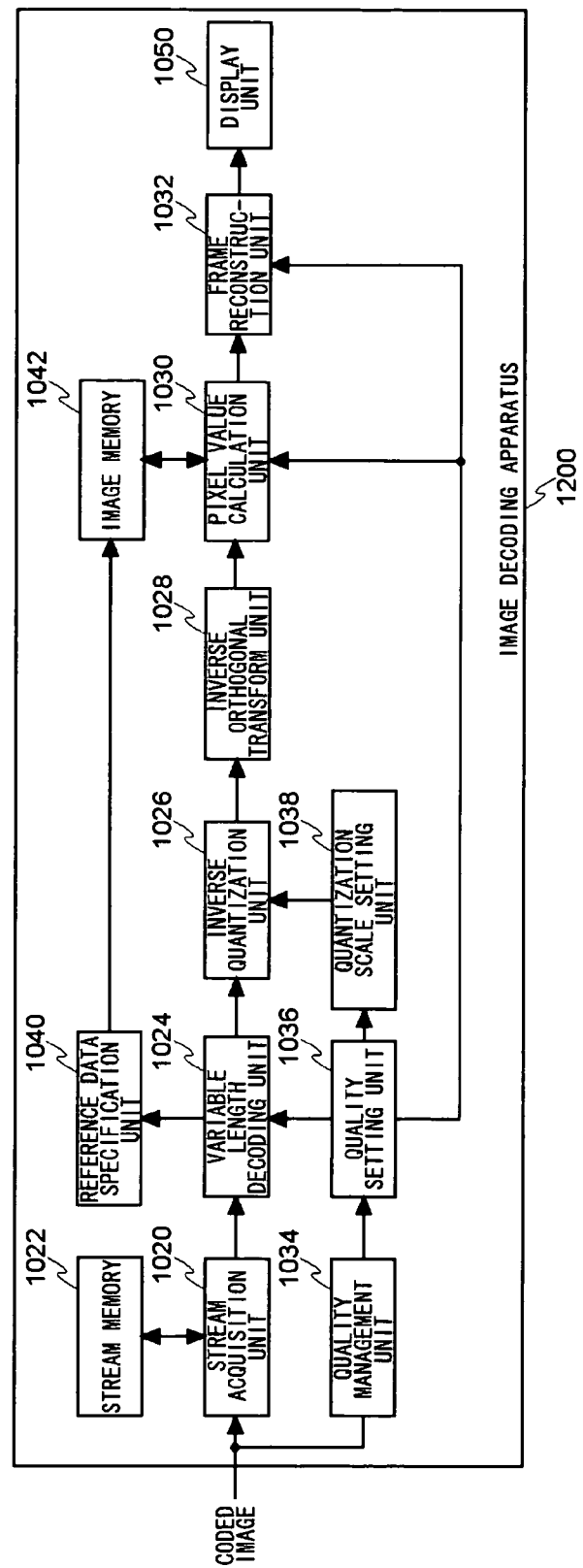
FIG. 8 is a block diagram of an image decoding apparatus according to embodiment 6.

FIG. 8 is a block diagram of an image decoding apparatus 1200 according to embodiment 6. The image decoding apparatus 1200 decodes a coded stream having additional quality information, such as the coded stream coded by the foregoing image coding apparatus 1100.

A stream acquisition unit 1020 acquires a coded stream from exterior, and stores it into a stream memory 1022 temporarily. The coded stream acquired may be one that is transmitted through streaming distribution. It may also be one that is recorded on a recording medium such as a DVD-ROM.

When a stream level for decoding is set by a quality setting unit 1036 to be described later, the stream acquisition unit 1020 discards some of the coded stream acquired and passes the remaining to a variable length decoding unit 1024 in accordance with that stream level. For example, high frequency components may be discarded for lowering its resolution.

The stream memory 1022 stores the coded stream input from the stream acquisition unit 1020 temporarily. The variable length decoding unit 1024 decodes the coded stream passed from the stream acquisition unit 1020 with respect to each bit plane, decodes quantized pixel data and various parameters, and outputs the resultant to an inverse quantization unit 1026. For a stream coded by inter-frame prediction coding, motion vectors are also decoded. For an entropy-coded stream, entropy decoding is performed.

The inverse quantization unit 1026 inversely quantizes the input pixel data, and outputs the resultant to an inverse orthogonal transform unit 1028. If a quantization scale is set by a quantization scale setting unit 1038 to be described later, the inverse quantization is performed based on the quantization scale. The inverse orthogonal transform unit 1028 restores pixel values that are transformed by a discrete cosine transform, a wavelet transform, or the like. For a stream coded by inter-frame prediction coding, difference values of corresponding pixels between frames are restored. The inverse orthogonal transform unit 1028 outputs these pixel values and the like to a pixel value calculation unit 1030. The pixel value calculation unit 1030 writes the restored pixel values into an image memory 1042.

The image memory 1042 retains the pixel values restored by the pixel value calculation unit 1030 temporarily. Incidentally, the image memory 1042 may use the same memory as the stream memory 1022 if the address spaces are different.

A reference data specification unit 1040 is necessary for a stream coded by inter-frame prediction coding such as MPEG. For reference values, the reference data specification unit 1040 specifies pixel values of the reference image retained in the image memory 1042 that are designated by the motion vectors passed from the variable length decoding unit 1024. In that case, the pixel value calculation unit 1030 adds the reference values specified by the reference data specification unit 1040 and the corresponding difference values acquired from the inverse orthogonal transform unit 1028, thereby restoring pixel values in the image memory 1042. The pixel value calculation unit 1030 also corrects luminance values or color differences when it is instructed of luminance or color-difference correction from the quality setting unit 1036.

A frame reconstruction unit 1032 assembles the pixel values restored by the pixel value calculation unit 1030 frame by frame to reconstruct moving image data. When a frame rate is set by the quality setting unit 1036, the frame reconstruction unit 1032 reconstructs the moving image data at that frame rate. When a display size is set by the quality setting unit 1036, pixels are skipped or interpolated. A display unit 1050 displays the moving image data reconstructed by the frame reconstruction unit 1032. Incidentally, the display unit 1050 may be an external device. In that case, the image decoding apparatus 1200 decodes the coded stream and outputs the decoded data to the not-shown display which is in a cable or wireless connection.

The quality management unit 1034 acquires quality information that is added to the coded stream input from exterior. When information for disabling the foregoing quality management is delivered separately, the quality management unit 1034 also acquires it. Based on the quality information acquired, the quality management unit 1034 manages the elapsed time of reproduction of the moving image, the billing status, and the like, and instructs the quality setting unit 1036 of the quality specified by this quality information.

Figure 9:
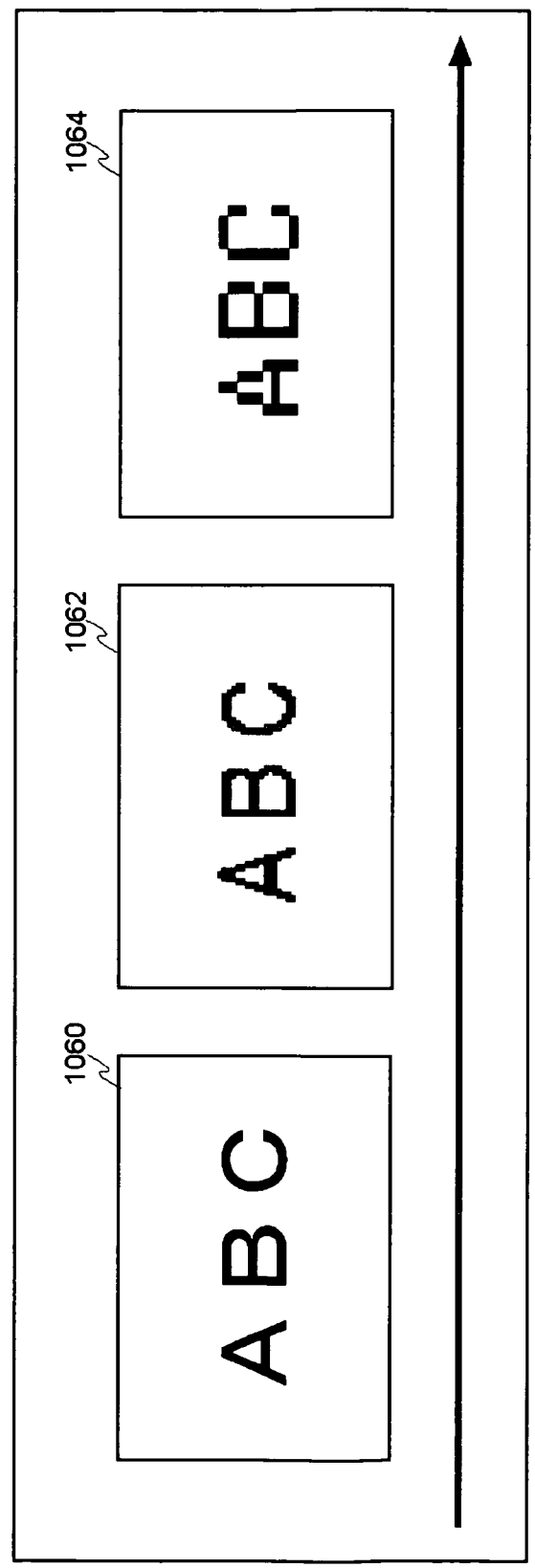
FIG. 9 is a diagram showing an example where resolution is lowered with time.

Based on the quality instructed by the quality management unit 1034, the quality setting unit 1036 sets quality-adjusting parameters to the individual units. Initially, in the case of changing the resolution, the quality setting unit 1036 sets a stream level to the stream acquisition unit 1020. FIG. 9 is a diagram showing an example where the resolution is lowered with time. The diagram shows the lapse of time from left to right. The left screen 1060 shows a screen that is decoded by using all the frequency components included in a coded stream. The center screen 1062 shows one that is decoded while discarding high frequency components of the coded stream. The right screen 1064 shows one that is decoded by using only direct-current components and low frequency components of the coded stream. As can be seen, the nonuse of the high frequency components lowers the resolution, and the use of the high frequency components raises the resolution. A coded stream having an SVC function can be changed in resolution easily by specifying, as a stream level, which frequency components to use.

Figure 10:
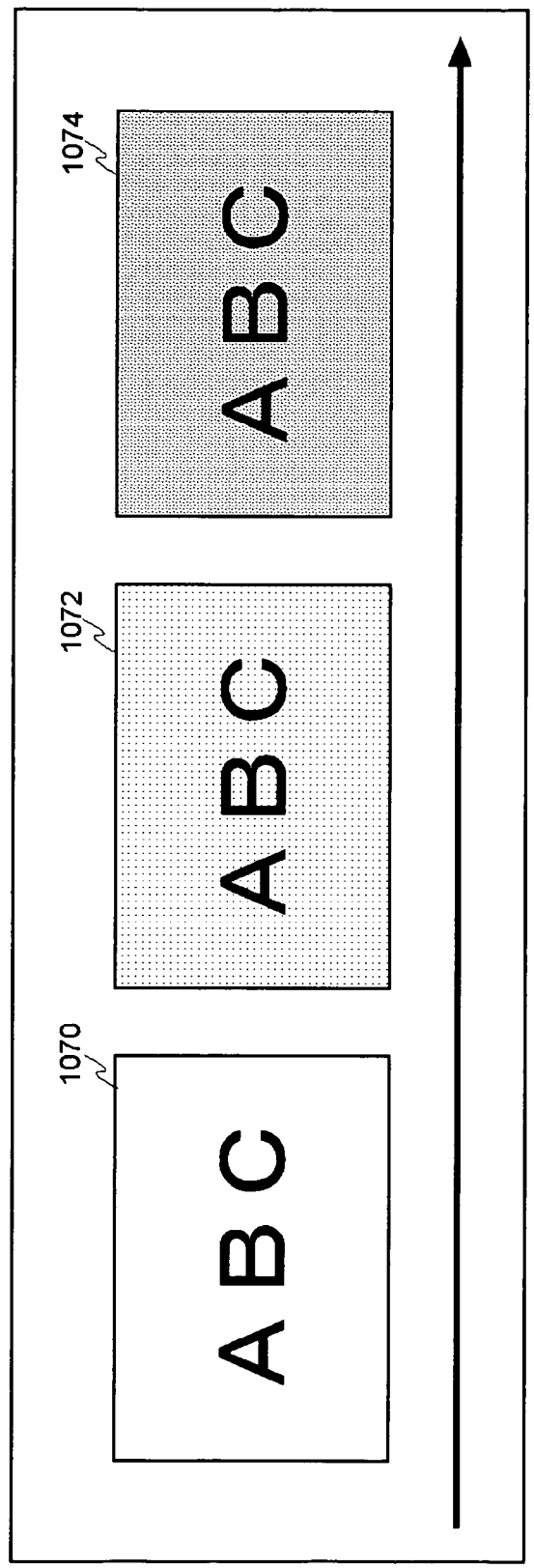
FIG. 10 is a diagram showing an example where image quality is lowered with time.

In the case of changing image quality, the quality setting unit 1036 sets a quantization scale to the quantization scale setting unit 1038. FIG. 10 is a diagram showing an example where the image quality is lowered with time. The image quality decreases from the left screen 1070 to the right screen 1074. The quality setting unit 1036 sets a quantization scale to the quantization scale setting unit 1038 so that the quantization scale decreases gradually. When an ROI function is implemented as in JPEG 2000, the entire screen may be set as the ROI area and the ROI information may be modified gradually.

Figure 11:
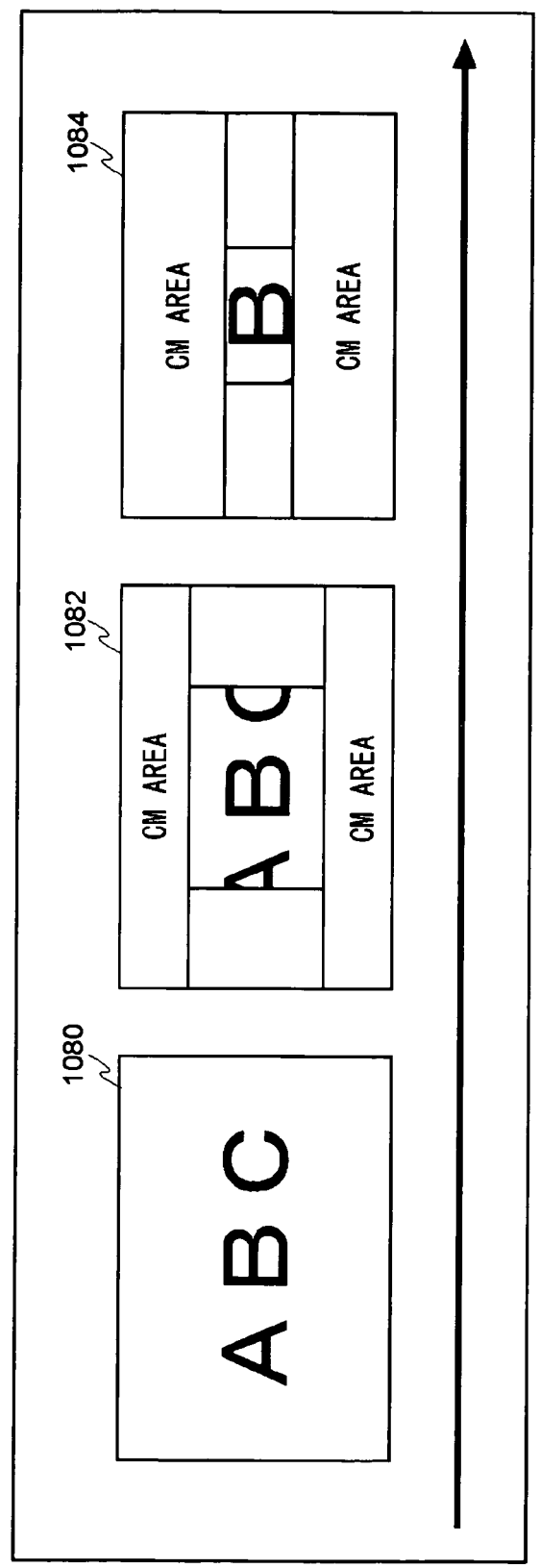
FIG. 11 is a diagram showing an example where the display area is narrowed down with time.

In the case of changing the display area, the quality setting unit 1036 sets ROI information to the quantization scale setting unit 1038. FIG. 11 is a diagram showing an example where the display area is narrowed down with time. The display area decreases from the left screen 1080 to the right screen 1084. The quality setting unit 1036 narrows down the ROI area toward the center. The areas other than the ROI area may be blackened, or used for CM areas as shown in FIG. 11. Advertisements such as logotypes and messages to be displayed in the CM areas may be coded along with the image in advance, or may be superimposed by the pixel value calculation unit 1030 of this image decoding apparatus 1200.

Incidentally, the processing of FIG. 11 and the processing of FIG. 9 or 10 can be combined to maintain the resolution or image quality of the area that is narrowed toward the center, while decreasing the resolution or image quality of the other areas.

Figure 12:
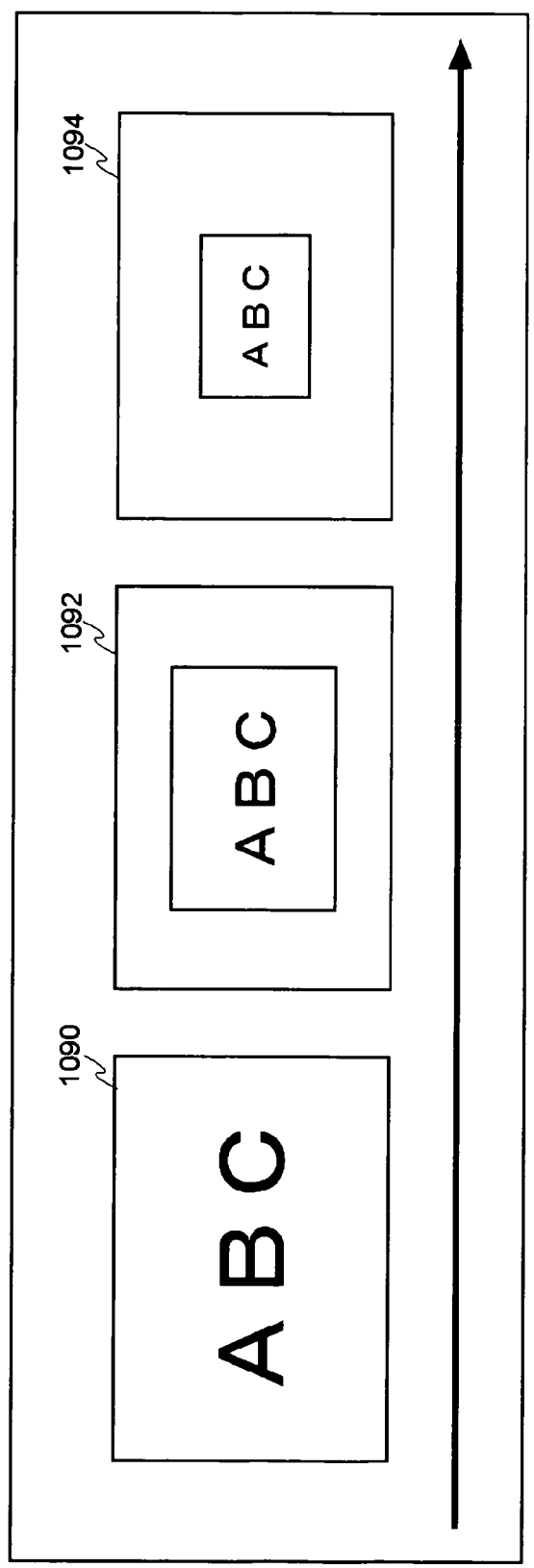
FIG. 12 is a diagram showing an example where an image is scaled down with time.

In the case of changing the size of the image to display, the quality setting unit 1036 sets a display size to the frame reconstruction unit 1032. FIG. 12 is a diagram showing an example where the image is scaled down with time. The image is scaled down from the left screen 1090 to the right screen 1094. The quality setting unit 1036 need not make any operation if the display size specified by the quality management unit 1034 is the same as the size of the moving image restored. If the display size is smaller than the size of the moving image restored, the quality setting unit 1036 instructs the frame reconstruction unit 1032 to skip pixels at a predetermined ratio. If the display size specified is greater than the size of the moving image restored, additional pixels are calculated from adjoining pixel values. If this scaling processing can cause a severe burden on the system, a dedicated scaling hardware circuit may be provided for that processing.

Figure 13:
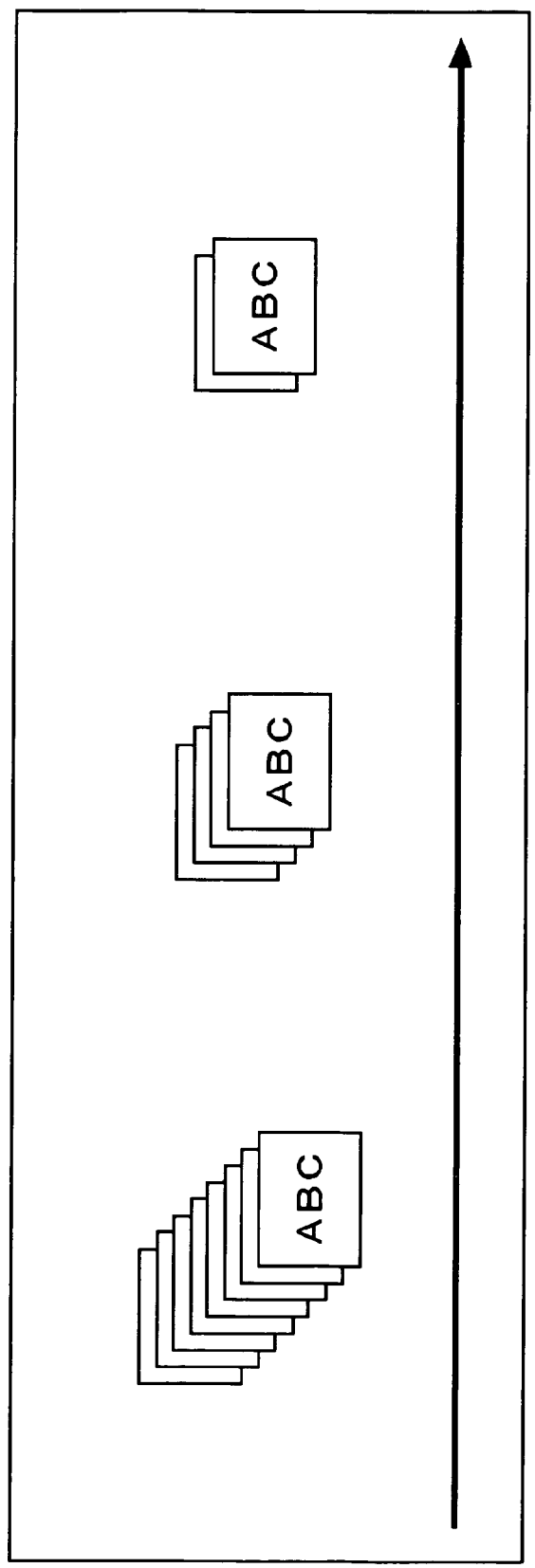
FIG. 13 is a diagram showing an example where the frame rate is reduced with time.

In the case of changing the frame rate, the quality setting unit 1036 sets a frame rate to the frame reconstruction unit 1032. FIG. 13 is a diagram showing an example where the frame rate is reduced with time. Note that the frame rate refers to the frequency of update of frames. In FIG. 13, the frame rate is reduced with a lapse of time. The frame rate for an identical period is reduced from eight frames to four frames, and to two frames. Incidentally, a frame shows a still image unless updated. The quality setting unit 1036 can thus specify a still image.

In the case of changing the brightness of the display image, the quality setting unit 1036 sets a luminance correction value to the pixel value calculation unit 1030. The pixel value calculation unit 1030 adds or subtracts the correction value to/from the original luminance values. The addition makes the image brighter, and the subtraction dimmer.

In the case of changing the color of the display image, the quality setting unit 1036 sets color-difference correction values to the pixel value calculation unit 1030. The pixel value calculation unit 1030 corrects color differences based on the correction values. Correcting the original color-difference values toward zero can bring the corrected image nearer to a monochrome. Color-difference values of zero produce a monochrome image.

The quality setting unit 1036 may change two or more of the foregoing parameters in combination. When information for disabling quality management is received, the quality setting unit 1036 resets the foregoing parameters to their normal values. Incidentally, the quality at the beginning of reproduction of a moving image can also be set arbitrarily. The quality may also be set to increase with time depending on applications, such as when it is desired to display the end-title credit of a movie, the last part of an image, or the like clearly.

As has been described, according to the present embodiment, it is possible to achieve an image decoding apparatus which can perform both protection of copyright and promotion of use of moving images. Image providers can protect copyright by degrading the quality of the moving images with time. Besides, it is possible to show high quality images for a certain period and impress users, thereby promoting the sales of the contents and the subscription to contents distribution services. Moreover, when the display area is narrowed down, it is possible to use the remaining space for advertisements of their own or other companies, and thereby earn advertising income.

Users can view high quality images for a certain period to obtain information for making an appropriate decision whether or not to purchase that contents. Users can sign a contract with the contents providers to reproduce the moving image with normal quality. Displaying advertisements outside the display area increases the possibility for users to access the contents at small or no fee. This mechanism is thus highly advantageous even for users.

Now, description will be given of an example where coded image data of adjusted quality is generated on the coding side before distributed to the decoding side.

Embodiment 7

Figure 14:
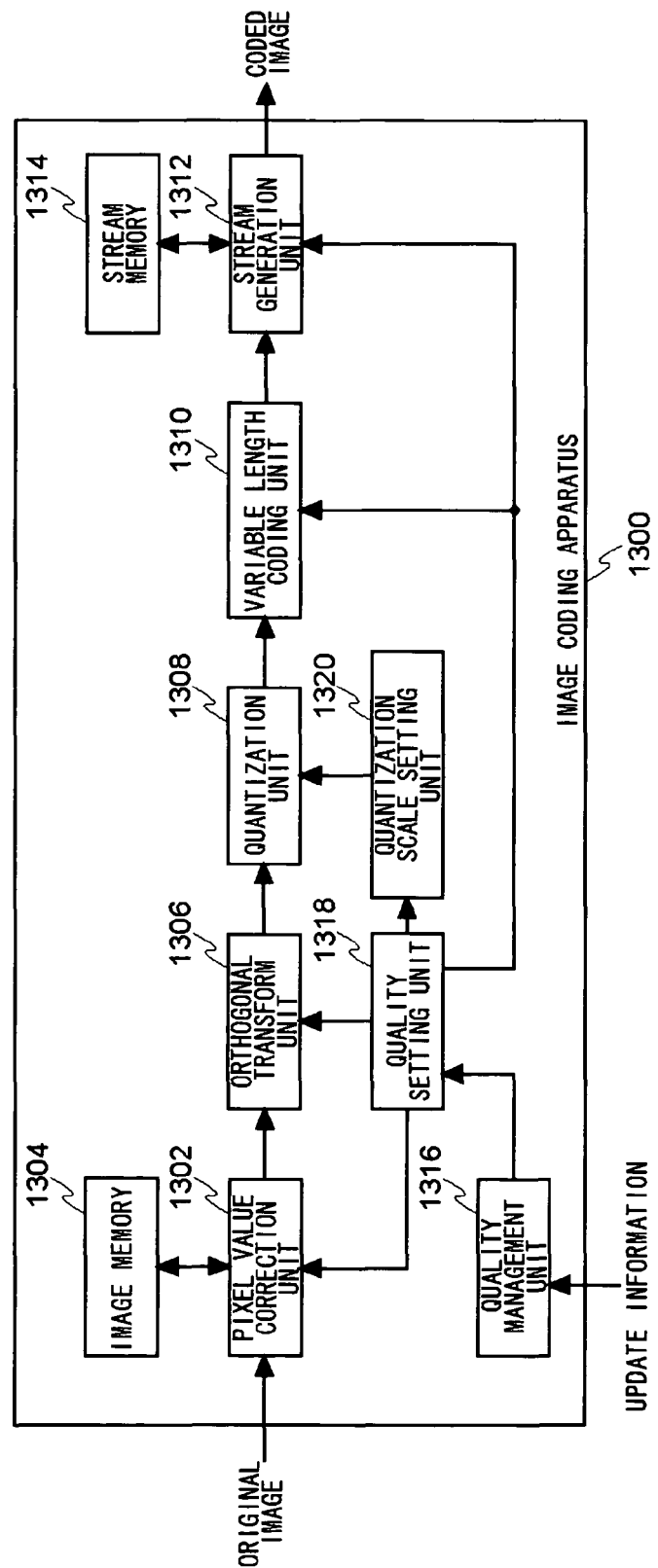
FIG. 14 is a block diagram of an image coding apparatus according to embodiment 7.

FIG. 14 is a block diagram of an image coding apparatus 1300 according to embodiment 7. Incidentally, the image coding apparatus 1300 is capable of inter-frame coding. This is common processing, and thus the corresponding parts are omitted from FIG. 14.

If a quality setting unit 1318 to be described later makes a change to luminance values and/or color-difference values, a pixel value correction unit 1302 corrects those values in accordance with setting values set by the quality setting unit 1318. An image memory 1304 is used for the correction. If no change will be made to the luminance values and the like, neither of the pixel value correction unit 1302 and the image memory 1304 need to be provided.

An orthogonal transform unit 1306 performs wavelet transforms, discrete cosine transforms, or the like. If resolution is set by the quality setting unit 1318 to be described later, the number of wavelet transforms is adjusted accordingly, for example. A quantization unit 1308 quantizes predetermined coefficients, such as the wavelet transform coefficients output from the orthogonal transform unit 1306, at predetermined quantization widths. If a quantization scale is set by a quantization scale setting unit 1320 to be described later, the quantization is performed based on the quantization scale. A variable length coding unit 1310 codes a bit string passed from the quantization unit 1308 bit plane by bit plane. The variable length coding unit 1310 also codes various parameters necessary for decoding. Incidentally, the bit string may be entropy-coded.

A stream generation unit 1312 assembles the coded image data input from the variable length coding unit 1310, thereby generating a coded stream. Then, the coded stream generated is output to a network or a recording medium. If a frame rate or display size is set by the quality setting unit 1318 to be described later, the stream generation unit 1312 changes the frame rate or display size accordingly. Here, the stream generation unit 1312 can use a stream memory 1314. Decoding apparatuses that receive the foregoing coded steam can decode it normally.

A quality management unit 1316 manages various types of quality set by the image provider so that the moving image changes in quality with time, and sets the same to the quality setting unit 1318. When quality management is cancelled due to such reasons as a purchase of the contents by a viewer, the quality management unit 1316 also informs it to the quality setting unit 1318.

Based on the quality set by the quality management unit 1316, the quality setting unit 1318 sets quality-adjusting parameters to the individual units. In the case of changing the resolution, the quality setting unit 1318 sets the number of wavelet transforms to the orthogonal transform unit 1306. In the case of changing the image quality, the quality setting unit 1318 sets a quantization scale to the quantization scale setting unit 1320.

In the case of changing the display area, the quality setting unit 1318 sets ROI information to the quantization scale setting unit 1320. In the case of changing the size of the image to display, the quality setting unit 1318 sets a display size to the stream generation unit 1312. In the case of changing the frame rate, the quality setting unit 1318 also sets a frame rate to the stream generation unit 1312.

In the case of changing the brightness of the display image, the quality setting unit 1318 sets a luminance correction value to the pixel value correction unit 1302. In the case of changing the color of the display image, the quality setting unit 1318 sets color-difference correction values to the pixel value correction unit 1302. Like the quality setting unit 1036 described in embodiment 6, the quality setting unit 1318 can also set parameters to the individual units. Each of the units can also change the quality of the moving image similarly.

As has been described, according to the present embodiment, it is possible to achieve an image coding apparatus which can perform both protection of copyright and promotion of use of moving images. When the moving image data of degraded quality is generated on the coding side, it is possible to reduce the volume of the coded data. This can reduce the amount of traffic on the network, and save the recording capacities of the hard disks or the like on the receiving user terminals. Moreover, it is possible to generate highly-versatile coded data which can be decoded by existing decoding apparatuses.

Up to this point, the present invention has been described in conjunction with several embodiments thereof. The foregoing embodiments have been given solely by way of example. It will thus be understood by those skilled in the art that various modifications may be made to combinations of the foregoing components and processes, and all such modifications are also intended to fall within the scope of the present invention.

In the foregoing embodiments, a server independent from the image coding apparatuses 1100 and 1300 may manage the billing statuses of users. User payments, when made, may be informed to the image coding apparatuses 1100 and 1300 to cancel the quality management. In this case, existing billing systems can be used.

The foregoing embodiments 5 and 6 have dealt with the cases where the quality information is added to the coded stream and transmitted to the decoding side. Nevertheless, the quality information may be downloaded to the decoding side separately. Spontaneous user downloading can be expected if reproduction is prohibited without this information. This eliminates the need for the coding side to add the quality information to the coded stream, whereby the configuration of the coding apparatus can be simplified.

Embodiment 8

The technical field of embodiment 8 is as follows. The invention relates to an image processing apparatus, an image display apparatus, and an image display method for decoding a coded image data stream having a hierarchical structure.

The related art of embodiment 8 is as follows. In recent years, the prevalence of such infrastructures as DVD media, digital broadcasting, and on-demand network communications has produced widespread use of digital contents. Since digital contents cause no degradation in quality even after duplication, copyright management is of high importance. Demands for legitimate protection of copyright on digital contents and other copyrighted materials are expected to grow in the future. Japanese Patent Laid-Open Publication No. 2001-86444 discloses a technique for prohibiting duplication by using copy control information included in a stream.

The problems to be solved by embodiment 8 are as follows. Techniques like this are no more than a uniform approach of either permitting or prohibiting, and it is difficult to satisfy various levels of demands both from image providers and from users. For example, image providers might lose business opportunities if they simply prohibit duplication. Besides, users have various orientations ranging from high-end to price-sensitive.

The present invention has been achieved in view of the foregoing circumstances. It is thus an object of the present invention to provide an image processing apparatus, an image display apparatus, and an image display method capable of flexible provision of images which is beneficial to both image providers and users who use the images.

The means for solving the problems of embodiment 8 are as follows. To solve the foregoing problems, an image processing apparatus according to one of the aspects of the present invention comprises: a decoding unit which acquires coded image data multiplexed so as to be decodable in a plurality of image qualities, and decodes the coded image data so as to produce at least two or more images having different image qualities; and a memory unit which stores a plurality of pieces of image data decoded in order to cope with predetermined processing. The "image quality" may include resolution. The "predetermined processing" may include displaying a plurality of images having respective different image qualities. In that case, the images may be displayed in a multi-window fashion.

According to this aspect, it is possible to make flexible provision of images which is beneficial to both image providers and users who use the images. In addition, a plurality of images having different image qualities can be processed in real time.

Another aspect of the present invention is also an image processing apparatus. This apparatus comprises: a decoding unit which acquires coded image data multiplexed so as to be decodable in a plurality of image qualities, and decodes the coded image data in a plurality of image qualities decodable; and a memory unit which stores a plurality of pieces of image data decoded in order to cope with predetermined processing.

According to this aspect, it is possible to make flexible provision of images which is beneficial to both image providers and users who use the images. In addition, a plurality of images having different image qualities can be processed in real time.

The decoding unit may decode the coded image data in all the image qualities decodable. According to this aspect, it is possible to create a situation where images can be provided from the coded image data the most flexibly.

The image processing apparatus may further comprise a copyright management unit which exercises copyright management on the plurality of pieces of image data stored in the memory unit in accordance with set copyright management information. The "copyright management information" may define a permitted image quality level when using the coded image data, or define a combination of an application and a permitted image quality level of the coded image data. According to this aspect, flexible copyright management becomes possible. For example, it is possible to establish image qualities to be subjected to the copyright management and ones not to.

The copyright management unit may add a noise component to at least one of the plurality of pieces of image data stored in the memory unit. According to this aspect, flexible copyright management becomes possible, instead of such copyright management as prohibiting use uniformly.

The image processing apparatus may further comprise a transmission unit which transmits image data selected from among the plurality of pieces of image data stored in the memory unit to a predetermined terminal. The transmission unit may transmit pieces of image data having different image qualities to a plurality of terminals, respectively, at substantially the same time. The transmission unit may transmit image data selected by a user operation, or transmit image data selected based on specification information on a predetermined terminal. This specification information may include resolution of a display unit of that terminal. According to this aspect, flexible image transmission becomes possible.

Another aspect of the present invention is an image display apparatus. This apparatus comprises: an image processing apparatus according to any one of the foregoing aspects; and a display unit which displays a plurality of images having respective different image qualities.

According to this aspect, it is possible to make flexible display of images which is beneficial to both image providers and users who use the images. In addition, a plurality of images having different image qualities can be displayed in real time.

The display unit may display the plurality of images having different image qualities while copyrights on the respective images are managed independently in accordance with set copyright management information. According to this aspect, flexible copyright management becomes possible.

The display unit may display the plurality of images having different image qualities in a multi-window fashion so as to have a user select an image of any one of the image qualities. According to this aspect, it is possible to improve the user operability.

Yet another aspect of the present invention is an image display method. This method comprises displaying a plurality of images having respective different image qualities decoded from coded image data multiplexed so as to be decodable in a plurality of image qualities.

According to this aspect, it is possible to make flexible display of images which is beneficial to both image providers and users who use the images. In addition, a plurality of images having different image qualities can be displayed in real time.

Incidentally, any combinations of the foregoing components, and the components and expressions of the present invention mutually replaced with methods, apparatuses, systems, recording medium, programs, and the like are also intended to constitute applicable aspects of the present invention.

By way of example, a method for coding a moving image by using Motion-JPEG 2000 scheme will be described briefly with reference to FIG. 15. A not-shown image coding apparatus generates a coded image data stream of a moving image by coding individual frames of the moving image continuously frame by frame. At the beginning of the coding process, an original image OI 102 corresponding to a single frame of the moving image is read into a frame buffer. The original image OI read into the frame buffer is hierarchized by a wavelet transformer.

The JPEG-2000 wavelet transformer uses a Daubechies filter. This filter functions as a high-pass filter and a low-pass filter both in x and y directions of an image simultaneously, thereby dividing the single image into four frequency subbands. These subbands consist of an LL subband, an HL subband and an LH subband, and an HH subband. The LL subband contains low frequency components both in the x and y directions. The HL subband and the LH subband contain low frequency components in either one of the x and y directions and high frequency components in the other direction. The HH subband contains high frequency components both in the x and y directions. This filter also has the function of reducing the number of pixels by half both in the x and y directions. That is, each subband has as many pixels as a half those of the unprocessed image both in the vertical and horizontal directions. A single application of the filtering thus produces subband images having a resolution, i.e., image size of ¼. As employed in this specification, an image obtained by applying a single wavelet transform to the original image OI will be referred to as a first-level image WI1. Hereinafter, an nth-level image will be referred to as WIn in accordance with the number of wavelet transforms applied thereto.

Figure 15:
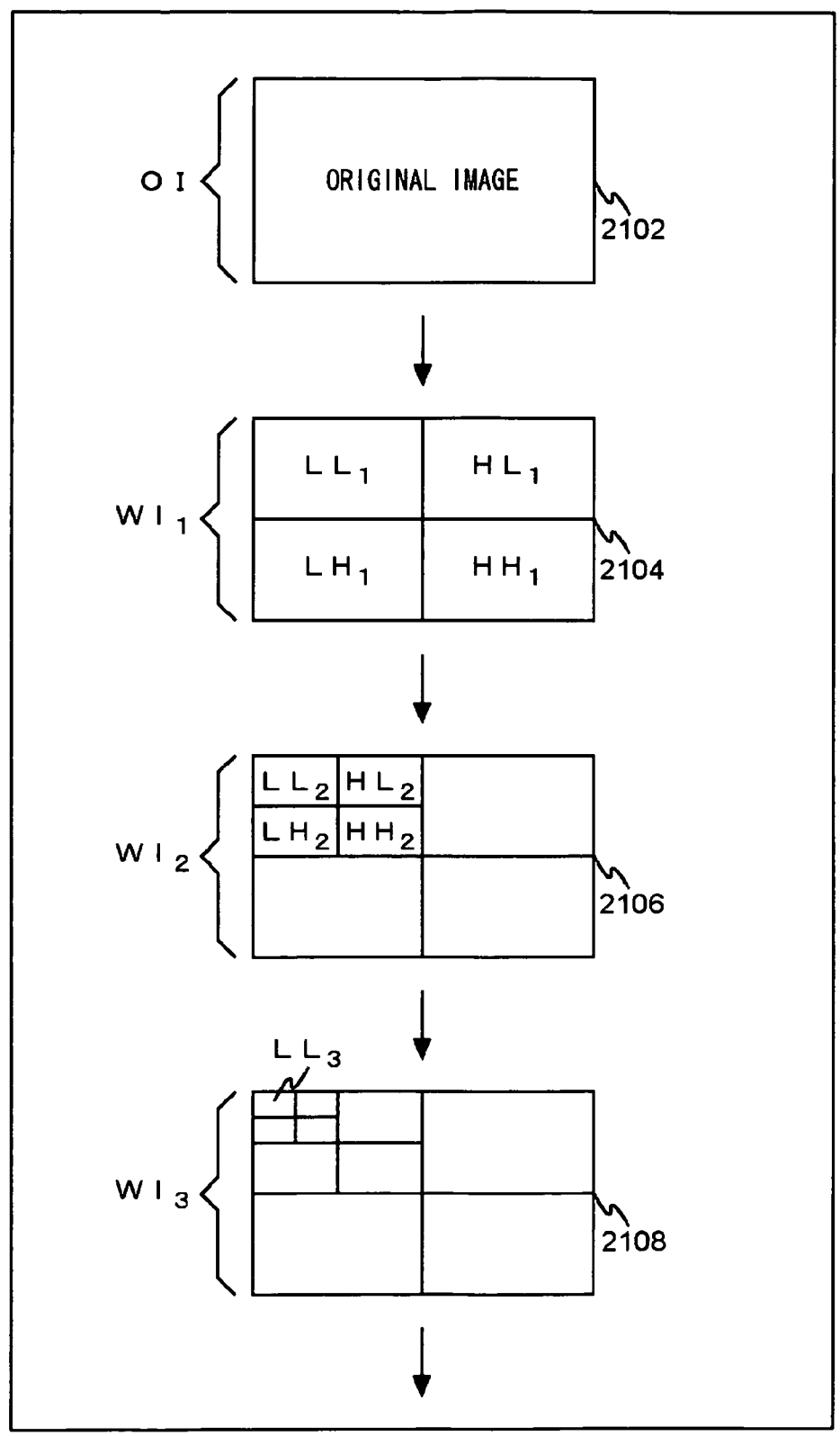
FIG. 15 is a diagram showing the procedure of image coding processing.

As schematically shown in FIG. 15, the first-level image WI1 104 has four subbands LL1, HL1, LH1, and HH1. A wavelet transform is applied to the first-level image WI1 104, whereby a second-level image WI2 106 is generated. The second and subsequent wavelet transforms will be applied to only the LL subband components of the images in the respective previous levels. Consequently, in the second-level image WI2 106, the LL1 subband of the first-level image WI1 is decomposed into four subbands LL2, HL2, LH2, and HH2. The wavelet transformer performs this filtering a predetermined number of times, and outputs the wavelet transform coefficients of the respective subbands. The image coding apparatus then performs quantization and other processing, and finally outputs coded image data CI.

For ease of explanation, the image coding apparatus in this example shall apply three wavelet transforms to the original image OI. Suppose, for example, that the original image OI 102 has 1440×960 pixels. Then, the LL1 subband of the first-level image WI1 104 has a size of 720×480, the LL2 subband of the second-level image WI2 106 a size of 360× 240, and the LL3 subband of the third-level image WI3 108 a size of 180×120.

As far as the hierarchical images are concerned, it should be noted that the low frequency components of the original image OI gather around the upper left in FIG. 15. In the case of FIG. 15, the LL3 subband which falls on the upper left corner of the third-level image WI3 is the lowest in frequency. Conversely, the most basic properties of the original image OI can be reproduced as long as this LL3 subband is accessible.

Aside from Motion-JPEG 2000, the coded data stream may be of, e.g., SVC (Scalable Video Codec) which provides a single stream including both a high quality HD stream and a low quality SD stream in combination. Motion-JPEG is also applicable. Among JPEG schemes are ones in which frames are transmitted in ascending order of the terms of their DCT (Discrete Cosine Transform) coefficients obtained by discrete cosine transform. Here, an image quality can be selected depending on up to what order of terms the coefficients are used for decoding. According to these specifications, spatial resolution can be coded hierarchically.

The foregoing example has been dealt with the case where the hierarchization is achieved by the coding of frequency division type. Nevertheless, coding of improved approximation accuracy type may be used for hierarchization. More specifically, the number of higher-order bits of DCT coefficients or wavelet coefficients to be decoded can be adjusted to achieve decoding in different image qualities. In MPEG-2, not only the foregoing spatial resolution but also time resolution can be coded hierarchically by adjusting the number of frames.

Figure 16:
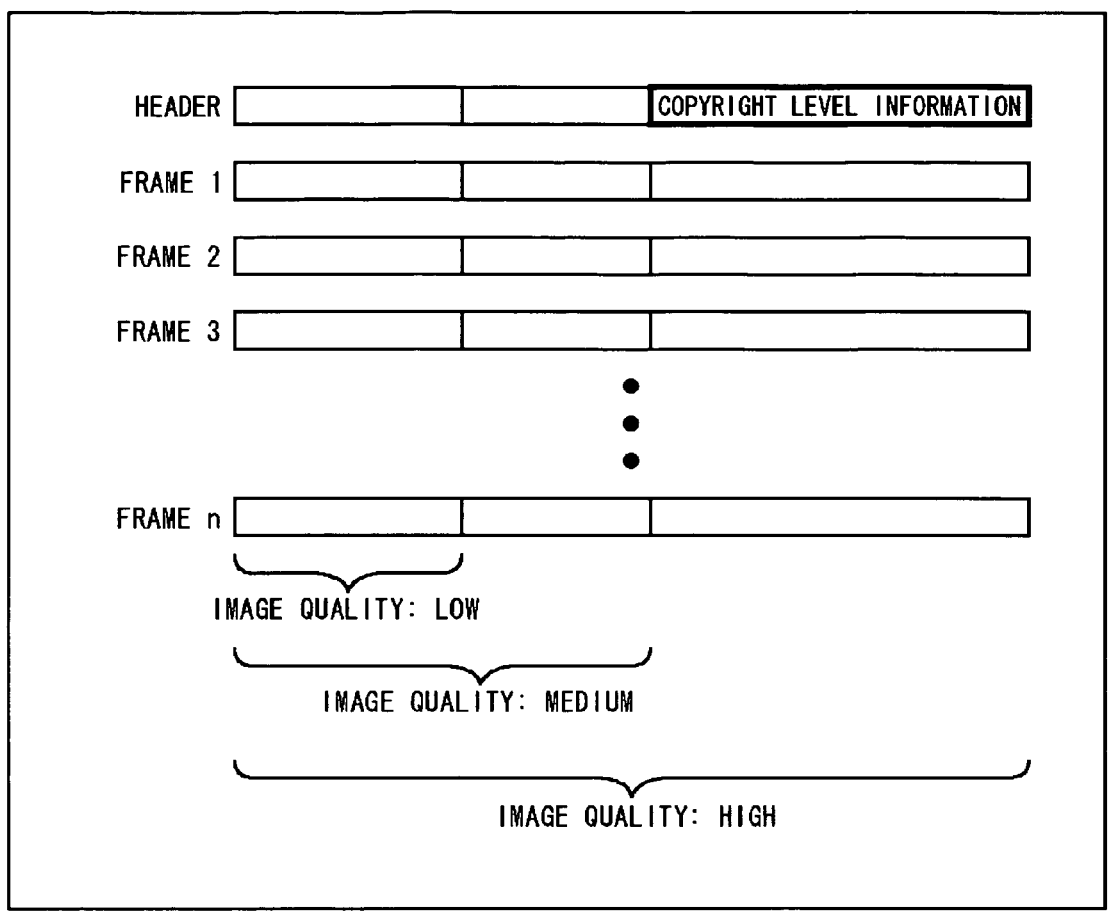
FIG. 16 is a diagram showing an example of the data structure of a coded image data stream.

FIG. 16 shows an example of the data structure of the coded image data stream. The header in FIG. 16 represents a stream header. On the coding side, copyright level information to be described later can be added to a free space in this header area. Each of the frames also has a not-shown frame header which describes information and the like necessary for decoding. Incidentally, the copyright level information may be added to frame headers. The information may be added to any of the frames in that group of frames, such as every few frames.

When the hierarchical coded image data CI is generated by frequency division as described above, each frame describes data on a low frequency component, a medium frequency component, and a high frequency component in succession from the top of the data area. Incidentally, data on a direct-current component appears before that of each low frequency component when the scheme in use also divides direct-current components. It is possible to reproduce images even from the first portions of the respective frames alone, whereas the images are low in quality. The image improves in quality as the last portions are involved in the reproduction. As described above, the hierarchical coded image data stream has both image data areas necessary for reproducing high quality images, and overlapping image data areas necessary for reproducing low quality images. A plurality of images having different image qualities can thus be reproduced from the single coded image data stream.

FIG. 17 shows an example of the copyright level information. The copyright level information is intended to manage copyright levels to be permitted to users who use the coded image data CI. The use of the coded image data CI is not managed in an either-or fashion, i.e., between full permission and prohibition. Instead, independent management is exercised depending on user patterns including applications, image qualities, and combinations of these. In FIG. 17, the copyright level information to be added to the coded image data CI is expressed in a table. The applications of the coded image data CI are shown on the horizontal axis, and the permitted image quality levels corresponding to the respective applications are shown on the vertical axis. Display, one of the applications, is permitted without limitation if in the low image quality. View-blocking noise such as scrambling is added in the medium and high image qualities. Display is thus substantially limited in the medium and high image qualities. Incidentally, this noise is no longer superimposed if a predetermined condition such as a fee payment is satisfied by the user. Initial display represents a function for displaying an image that should later be hardly visible due to superimposed noise, onto a noise-free normal screen for a certain period since the beginning of display. In FIG. 17, one minutes of initial display is provided in the high image quality, and 30 seconds in the medium image quality. Noise will be superimposed on the image thereafter.

Transmission represents a function for transmitting the coded image data CI from the decoding device to another device. In FIG. 17, transmission is permitted without limitation in all the image qualities. Duplication is prohibited in the high image quality, and is permitted without limitation in the low and medium image qualities. Edit is prohibited in the medium and high image qualities, and is permitted without limitation in the low image quality. This editing may include such operations as removing commercial breaks from coded image data that is received in a digital television broadcast. In that case, the coded image data can be duplicated in the medium image quality, but not when commercial breaks are removed.

Image providers can manage such profile tables user by user, and update the individual items in the profiles if necessary. When the coded image data CI is provided to paid users, different profiles may be assigned depending on fees paid by the users, price plans selected, etc. The available applications and the permitted image levels for those applications also vary depending on the profiles. The profiles may also be created region by region or time by time, instead of user by user. For example, time-based profiles can be created to impose time limits on the availability of contents for users. If user apparatuses are configured to switch profiles after a certain period in time, time limits can be set so as to lower the permitted image quality levels or restrict some uses, instead of making all the contents unavailable after that period.

Figure 18:
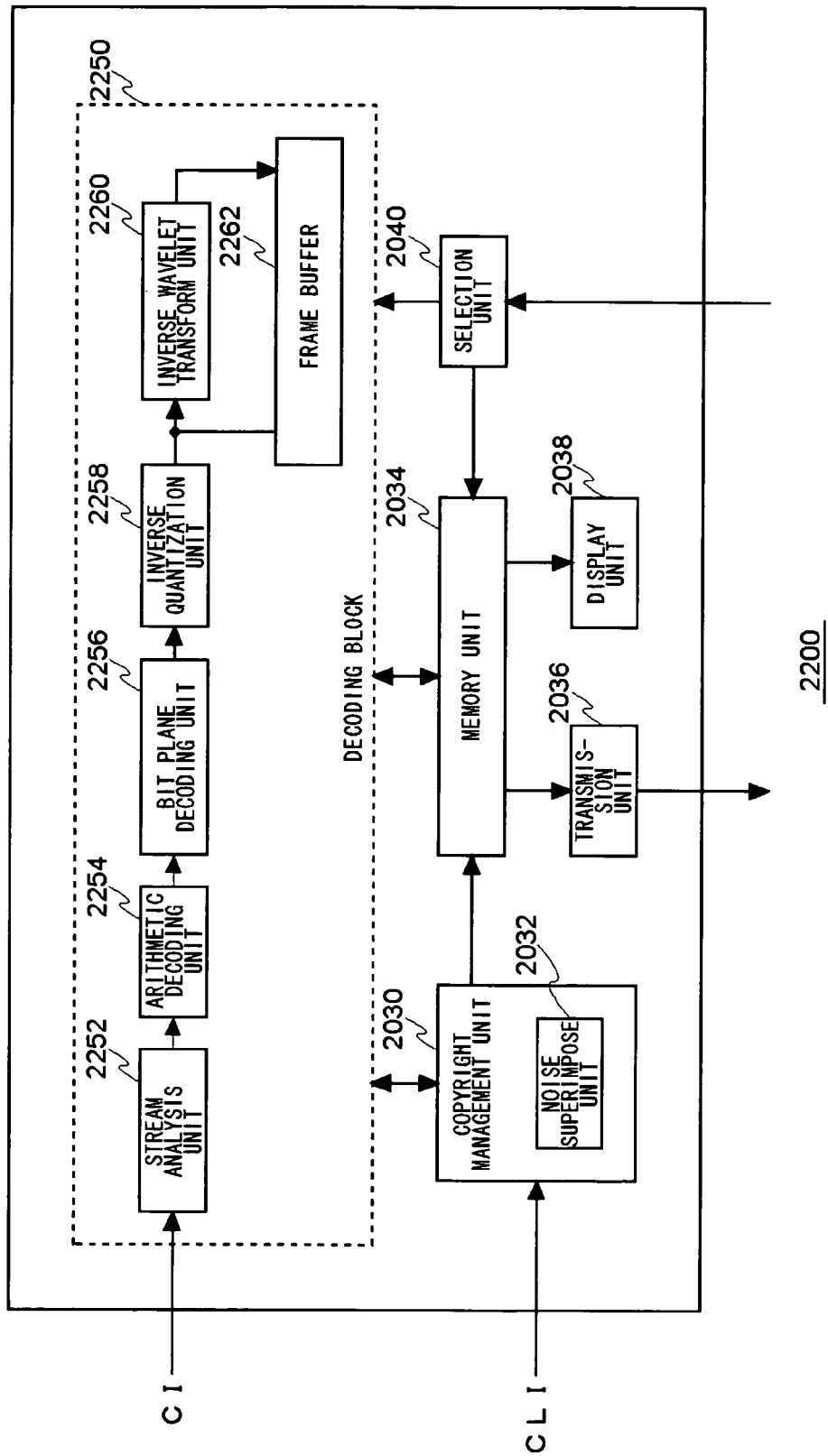
FIG. 18 is a diagram showing the configuration of an image processing apparatus according to embodiment 8 of the present invention.

Now, description will be given of an image processing apparatus 2200 which decodes a coded image data stream hierarchized as described above. FIG. 18 shows the configuration of the image processing apparatus 2200 according to embodiment 8 of the present invention. In terms of hardware, the image processing apparatus 2200 can be achieved by an arbitrary computer CPU, a memory, and other LSIs. In terms of software, it can be achieved by a program which is loaded on a memory and has decoding functions. The functional blocks shown here are achieved by the cooperation of these. It will thus be understood by those skilled in the art that these functional blocks may be achieved in various forms including hardware alone, software alone, and combinations of these.

The image processing apparatus 2200 comprises a decoding block 2250. The decoding block 2250 includes a stream analysis unit 2252, an arithmetic decoding unit 2254, a bit plane decoding unit 2256, an inverse quantization unit 2258, an inverse wavelet transform unit 2260, and a frame buffer 2262.

The stream analysis unit 2252 acquires a coded image data stream CI from exterior, and analyzes the data stream. The coded image data stream CI may be downloaded over a network, acquired via airwaves, or acquired from a recording medium containing the same. If copyright level information is added to a header or the like of the coded image data CI, the stream analysis unit 2252 detects and passes it to a copyright management unit 2030.

The arithmetic decoding unit 2254 performs a stream analysis, and applies arithmetic decoding to the resulting data string to be decoded. The bit plane decoding unit 2256 decodes the data resulting from the arithmetic decoding into bit planes with respect to respective color components. The inverse quantization unit 2258 inversely quantizes the quantized data decoded. The inverse wavelet transform unit 2260 applies inverse wavelet transforms to the nth-level image WIn resulting from the inverse quantization, by using the frame buffer 2262. Each time an inverse wavelet transform is applied to the coded image data CI, an image of the higher level is obtained. Decoding up to the topmost level produces decoded image data DI.

The decoding block 2250 outputs a plurality of levels of image data developed in the frame buffer 2262 to a memory unit 2034. For example, the image data developed in all the levels from the first to the topmost level may be output. In this case, all the levels of image data can be output by outputting the image data in the frame buffer 2262 to the memory unit 2034 each time an inverse wavelet transform is performed. Otherwise, image data in two or more levels out of the first to the topmost levels may be output to the memory unit 2034 in accordance with predetermined settings. For example, the first to the topmost levels may be output alternately.

The copyright management unit 2030 manages copyrights on the coded image data CI to be used in this image processing apparatus 2200. The copyright management unit 2030 manages the copyright level information passed from the stream analysis unit 2252 or copyright level information CLI acquired from an image provider's server over the Internet or other network. Such copyright level information may include information for permitting uses that are so far limited, depending on such factors as a fee payment. For example, information for permitting display in the high image quality may be included if it is so far limited. When the user uses this coded image data CI, the copyright management unit 2030 identifies the permitted image quality corresponding to the application, and manages a plurality of pieces of image data having different image qualities stored in the memory unit 2034.

The copyright management unit 2030 may include a noise superimpose unit 2032. The noise superimpose unit 2032 superimposes a predetermined noise component on the decoded image data so as to generate a view-blocking display such as scrambling. The noise component may be superimposed while inverse wavelet transforms are performed in the frame buffer 2262 of the decoding block 2250. It may also be superimposed when the image data stored in the memory unit 2034 is further output to the transmission unit 2036 or the display unit 2038. Incidentally, the noise superimpose unit 2032 need not be provided if the copyright management is only exercised by simply prohibiting image display in certain image qualities. Moreover, when this image processing apparatus 2200 will not make any copyright management, the copyright management unit 2030 need not be provided.

The memory unit 2034 stores the image data output from the decoding block 2250. In the present embodiment, the memory unit 2034 can store a plurality of pieces of image data having different image qualities, and provide images having the same contents but different image qualities to the transmission unit 2036 and/or the display unit 2038 simultaneously.

Figure 19:
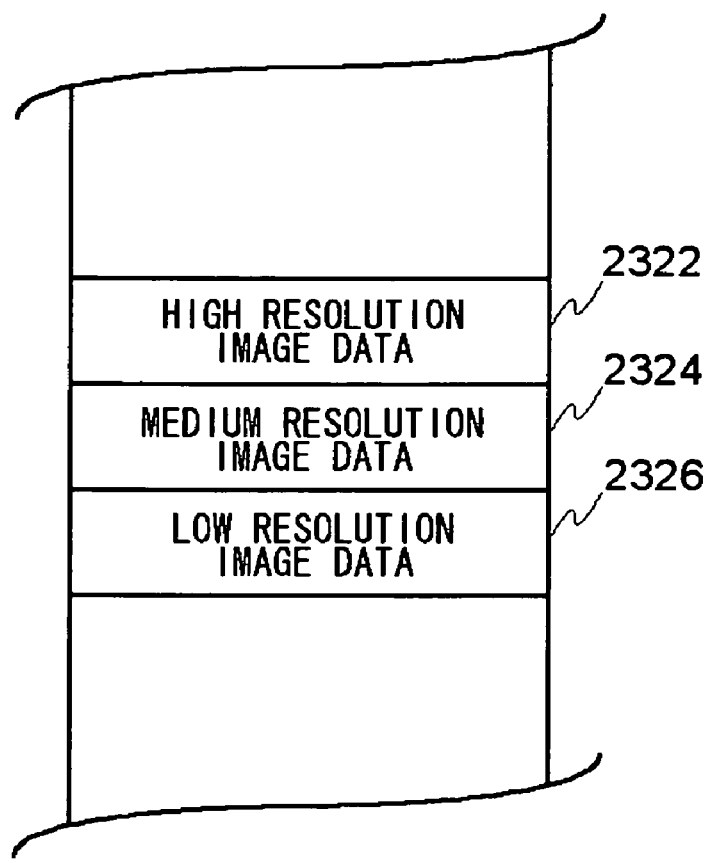
FIG. 19 is a diagram showing the data structure of a memory unit according to embodiment 8.

FIG. 19 shows the data structure of the memory unit 2034 according to the present embodiment 8. The memory unit 2034 stores a plurality of pieces of image data having different image qualities which are decoded from a single coded image data CI. In FIG. 19, high resolution image data 2322, medium resolution image data 2324, and low resolution image data 2326 are stored in respective independent forms. In the case of moving images, the pieces of image data in the respective areas are updated in succession, whereas the pieces of image data stored are substantially of the same scene.

The transmission unit 2036 transmits the image data stored in the memory unit 2034 to such terminals as a TV set, PC, a cellular phone, and a PDA (Personal Digital Assistance) via wired or wireless communications. The display unit 2038 displays the image data stored in the memory unit 2034. Incidentally, this image processing apparatus 2200 has only to have at least either one of the transmission unit 2036 and the display unit 2038.

A selection unit 2040 selects which image data to output from among the plurality of pieces of image data stored in the memory unit 2034 when outputting image data from the memory unit 2034 to the transmission unit 2036 or the display unit 2038. The selection unit 2040 may select data in response to a user instruction from a not-shown operation unit, or based on predetermined specification information. The specification information may include the resolution of the display unit 2038, the resolution of the display on a destination of transmission, the computing speed of the decoding block 2250, and the memory capacity of the same. For example, the selection unit 2040 may acquire the resolution of the display of a destination terminal in advance, so that image data having a highest resolution within that value can be selected automatically.

Next, description will be given of an example of operation of the image processing apparatus 2200 according to the present embodiment 8. Since it holds a plurality of pieces of image data having different image qualities in the memory unit 2034, the image processing apparatus 2200 can realize various applications as described below.

Figure 20:
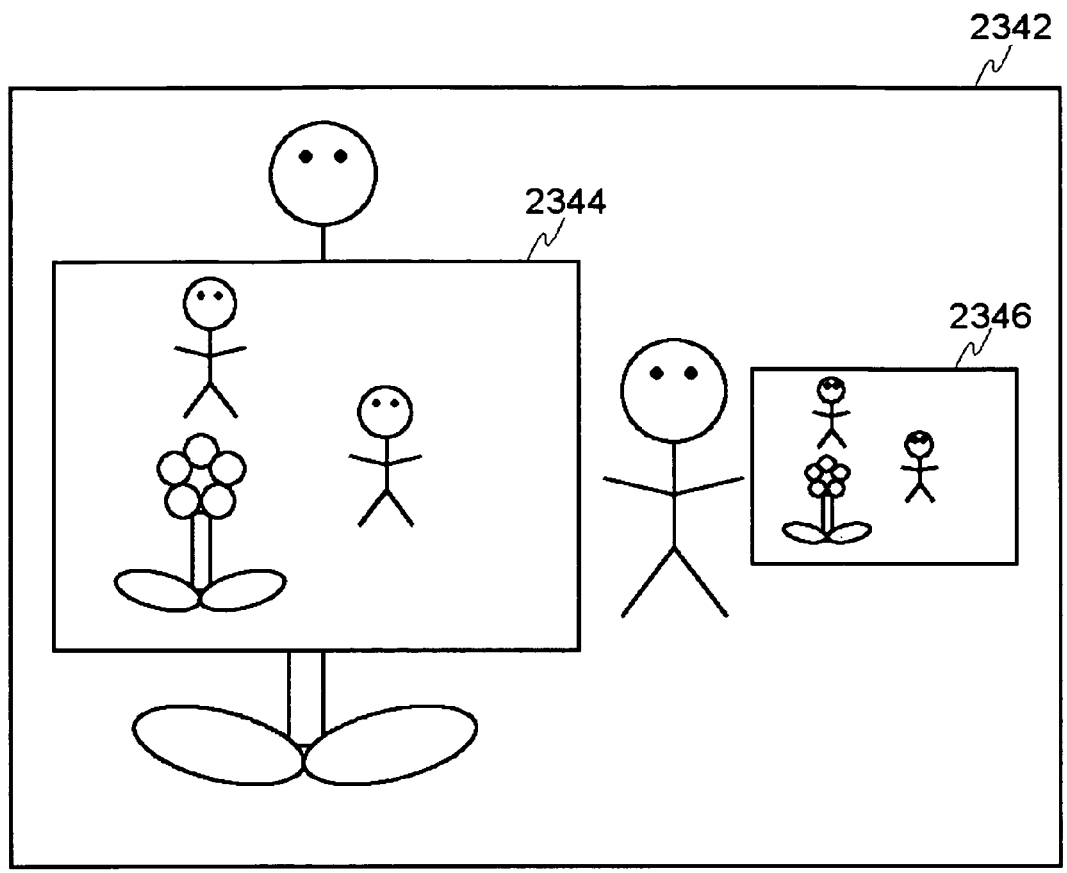
FIG. 20 is a diagram showing a screen on which images having the same contents but different image qualities are displayed in a multi-window fashion.

First, this image processing apparatus 2200 can display images having the same contents but different image qualities at substantially the same time. FIG. 20 shows a screen on which images having the same contents but different image qualities are displayed in a multi-window fashion. In FIG. 20, three images, i.e., a high resolution image 2342, a medium resolution image 2344, and a low resolution image 2346 generated from the high resolution image data 2322, the medium resolution image data 2324, and the low resolution image data 2326 are displayed to overlap on a single screen. The user can select which one to display from among the plurality of images having different image qualities displayed on the display unit 2038. The selection unit 2040 exercises control so that the image data for displaying the user-selected image alone is output from the memory unit 2034 to the display unit 2038.

A not-shown resizing unit may scale up or down the selected image data according to a user instruction. Note that image data scaled up can merely cause block noise, not improve the image quality, if it originally has low resolution. The image selection screen as shown in FIG. 20 may appear any time in response to user operations.

This configuration allows such processing that a user who is viewing the medium resolution image switches to the high resolution image so as to watch a more dynamic image. This configuration also allows such applications as billing different fees depending on the display image qualities. Fee rates per unit time of display may be determined depending on the image quality. For example, low quality display can be set at a low rate or for free, and high quality display at a relatively high rate. This allows such viewing mode that a user can select low quality images as long as simply following the story, and select high quality images when at the climax. To achieve this, a time monitoring unit may be provided. The not-shown time monitoring unit monitors the selection unit 2040, and records in which image qualities and for how many hours the user views the images as viewing time information. Then, this viewing time information is transmitted to the image provider's server or the like after the end of the view, so that the image provider can calculate from that information how much fees to charge to the user.

Figure 21:
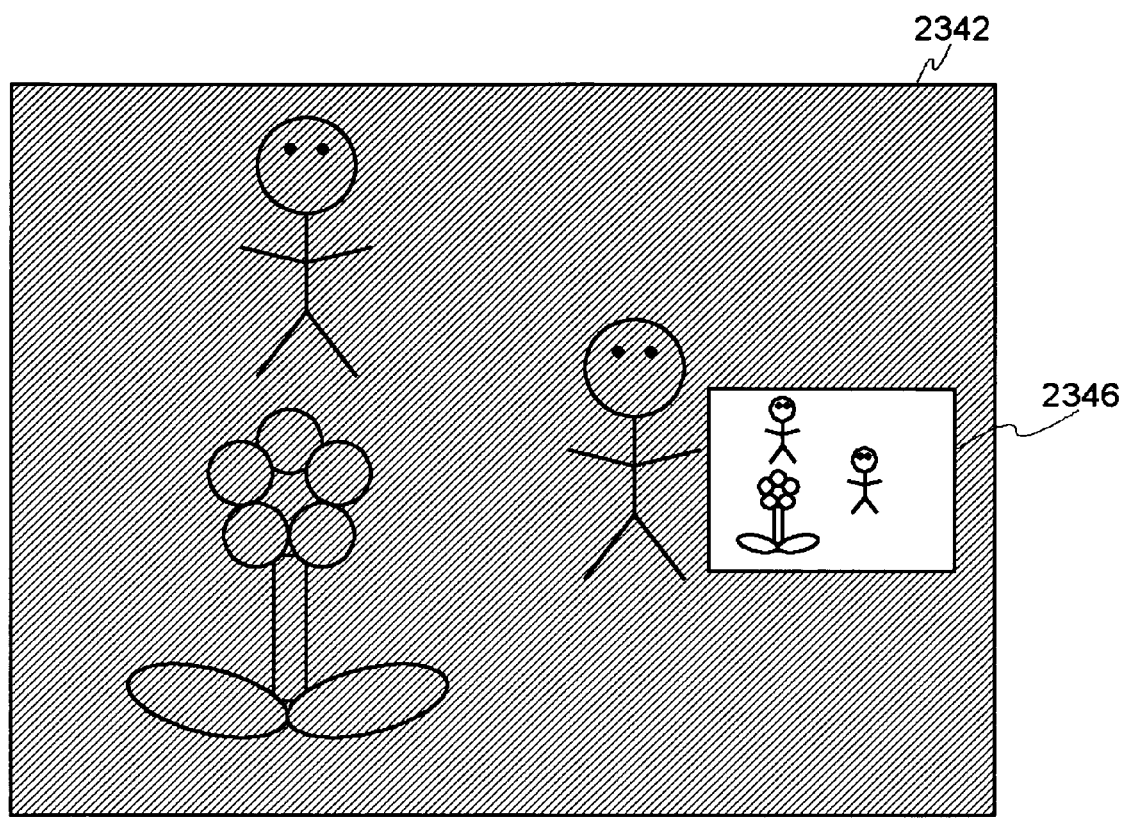
FIG. 21 is a diagram showing a screen on which images having the same contents but different image qualities, including one having noise superimposed thereon, are displayed in a multi-window fashion.

When this image processing apparatus 2200 displays images having the same contents but different image qualities at substantially the same time, view-blocking noise may be superimposed on one or more of the images. FIG. 21 shows a screen on which images having the same contents but different image qualities, including noise-superimposed one, are displayed in a multi-window fashion. In FIG. 21, the high resolution image 2342 generated from the high resolution image data 2322 is scrambled. As described above, in accordance with the copyright level information acquired, the copyright management unit 2030 can superimpose noise on images having image qualities that are subject to copyright management by the image provider. Moreover, such a control as descrambling the screen for a limited period of time is also possible. For example, it is possible to exercise such a control that an image having the image quality to be managed is displayed normally for several tens of seconds since the beginning of display. Then, the image may be switched to a scrambled image. If the user wants to remove the superimposed noise from the image and view the image, he/she can select the image and make a predetermined procedure such as a fee payment to remove the noise.

This image processing apparatus 2200 is also capable of transmitting images having the same contents to a plurality of terminals at substantially the same time. In this mode of use, the image processing apparatus 2200 can be operated as a home server. Here, images having different image qualities can be transmitted to respective terminals. Noise-superimposed images can also be transmitted to one or more of the plurality of terminals. Which quality images to transmit to which terminals can be specified by user operations. The selection unit 2040 may also transmit images of optimum image qualities automatically based on specification information on the destination terminals. For example, low resolution image data may be automatically transmitted to terminals having small display areas such as a cellular phone. Users can easily instruct the image processing apparatus 2200 to transmit image data to their cellular phones so that they can view the images even when leaving home. For example, it is possible to continue watching TV contents even after leaving home by using a cellular phone.

As has been described, according to the present invention, it is possible to realize flexible provision of images which is beneficial to both image providers and users who use the images. More specifically, since the memory unit stores image data on the same contents but in different image qualities, those pieces of image data can be used in real time to achieve various types of processing. For example, a plurality of images having different image qualities may be displayed in a multi-window fashion. Images having different image qualities may be transmitted to respective different terminals at substantially the same time. Image providers can utilize these functions to effect various sales techniques and sales promotion techniques.

Moreover, since the copyright management is exercised depending on the individual image qualities and applications, it is possible to balance the demands for copyright protection from image providers with the demands for use from users flexibly, instead of either-or choices between permitting and prohibiting the use of images.

Up to this point, the present invention has been described in conjunction with several embodiments thereof. The foregoing embodiments have been given solely by way of example. It will be understood by those skilled in the art that various modifications may be made to combinations of the foregoing components and processes, and all such modifications are also intended to fall within the scope of the present invention.

Embodiment 8 has dealt with a hierarchical structure of frequency division type. However, a hierarchical structure of improved approximation accuracy type may be used instead. In that case, images of various image quality levels can be decoded by discarding a predetermined number of lower order bits out of the bit string of the wavelet transform coefficients. That is, the copyright management unit 2030 can adjust the image quality level by instructing the bit plane decoding unit 2256 of the number of bits to transform.

When this method of hierarchization is used, it is possible to make a distinction in image quality level between individual areas of an image. In that case, each of the profiles on the table for managing the copyright level information shown in FIG. 17 may be described with three parameters, i.e., application, image quality level, and image area, not the two parameters or the application and image quality level alone. The profiles may also be described with two parameters of image quality level and image area. Here, image providers can exercise more flexible copyright management than in the foregoing embodiment 8.

Different image qualities can be achieved not only by hierarchizing the resolution, but by hierarchizing the compression rate or the number of colors as well. The compression rate can be hierarchized by using the layering function of JPEG 2000. Color images are expressed by luminance components and color-difference components. Then, the color-difference components may be subjected to the foregoing hierarchization techniques.

While the preferred embodiments of the present invention have been described using specific terms, such description is for illustrative purposes only, and it is to be understood that changes and variations may be made without departing from the spirit or scope of the appended claims.

What is claimed is:

1. An image display apparatus comprising:
a display unit configured to display a moving image; and
a processing unit configured to cause, while the moving image is displayed, the display unit to display a moving displayed image such that an image quality of the moving image displayed on the display unit is lowered with time in accordance with a setting value for adjusting the image quality of the moving image to run a sales promotion of moving image content while providing copyright protection to the moving image content.

2. The image display apparatus according to claim 1, wherein the setting value is one for reducing at least one of resolution, image quality, and a frame rate of the moving image stepwise.

3. The image display apparatus according to claim 1, wherein the setting value is one for reducing at least one of a luminance and color differences of the moving image stepwise.

4. The image display apparatus according to claim 1, wherein the setting value is one for narrowing down a display area of the moving image stepwise.

5. The image display apparatus according to claim 4, wherein the processing unit displays a predetermined advertisement outside a display area of the moving image in a display range of the display unit.

6. The image display apparatus according to claim 1, wherein the processing unit fixes the setting value in response to a predetermined action of a user.

7. An image coding apparatus comprising:
a coding unit which codes moving image data; and
an adding unit which adds a predetermined setting value to the coded moving image data so that, while a moving image is being displayed, an image quality of the displayed moving image is lowered with time in accordance with a setting value for adjusting the image quality of the moving image to run a sales promotion of moving image content while providing copyright protection on the moving image content.

8. The image coding apparatus according to claim 7, wherein the setting value is one for reducing at least one of resolution, image quality, and a frame rate of the moving image stepwise.

9. The image coding apparatus according to claim 7, wherein the setting value is one for reducing at least one of a luminance and color differences of the moving image stepwise.

10. The image coding apparatus according to claim 7, wherein the setting value is one for narrowing down a display area of the moving image stepwise.

* * * * *